United States Patent
Gerlach

(10) Patent No.: US 10,311,091 B2
(45) Date of Patent: Jun. 4, 2019

(54) GENERATION AND PRESENTATION OF AN OVERVIEW OF AN ELECTRONIC MAGAZINE ISSUE

(71) Applicant: Apple Inc., Cupertino, CA (US)

(72) Inventor: James N. Gerlach, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/934,731

(22) Filed: Mar. 23, 2018

(65) Prior Publication Data

US 2018/0276296 A1  Sep. 27, 2018

Related U.S. Application Data

(60) Provisional application No. 62/476,177, filed on Mar. 24, 2017.

(51) Int. Cl.
*G06F 16/31* (2019.01)
*G06F 16/34* (2019.01)
(Continued)

(52) U.S. Cl.
CPC ............ *G06F 16/345* (2019.01); *G06F 16/31* (2019.01); *G06F 16/38* (2019.01); *G06F 16/438* (2019.01); *G06F 16/583* (2019.01)

(58) Field of Classification Search
None
See application file for complete search history.

(56) References Cited

U.S. PATENT DOCUMENTS 6,029,182 A  2/2000 Nehab et al.
6,199,082 B1  3/2001 Ferrel et al.
(Continued)

FOREIGN PATENT DOCUMENTS

EP  1139253  4/2001
EP  1139253 A1  4/2001
(Continued)

OTHER PUBLICATIONS

EPO Supplementary Search Report, counterpart European Patent Application No. 15871226.5 (dated May 7, 2018), 2 pgs.
(Continued)

*Primary Examiner* — Asher D Kells
(74) *Attorney, Agent, or Firm* — Fletcher Yoder PC

(57) ABSTRACT

As may be implemented in accordance with one or more embodiments herein, content in each of a plurality of electronic magazine issues is communicated as follows. One of the plurality of electronic magazine issues is identified for communication with a magazine reader, such as a user reading magazine issues on an end device (e.g., tablet or other computer). At a user display device, and via a user-communication interface medium, an issue cover having an issue name and a cover image is caused to be displayed for the identified magazine issue, as is a summary or overview of articles for the identified magazine issue. For the latter, the display of the issue cover is autonomously caused to be replaced by a set of successive screen pages respectively corresponding to the articles, with each of the successive screen pages including a feature image and article-characterization text associated with one of the articles.

21 Claims, 23 Drawing Sheets

(51) Int. Cl.
  *G06F 16/38* (2019.01)
  *G06F 16/438* (2019.01)
  *G06F 16/583* (2019.01)

(56) References Cited

U.S. PATENT DOCUMENTS

| | | | |
|---|---|---|---|
| 6,397,231 B1* | 5/2002 | Salisbury | G06F 17/3089 |
| | | | 707/999.102 |
| 6,574,629 B1 | 6/2003 | Kaufman et al. | |
| 7,076,534 B1 | 7/2006 | Cleron et al. | |
| 7,107,549 B2 | 9/2006 | Deaton et al. | |
| 7,827,180 B2 | 11/2010 | Achilles et al. | |
| 7,908,358 B1 | 3/2011 | Prasad et al. | |
| 8,209,600 B1 | 6/2012 | Koh et al. | |
| 8,397,161 B1 | 3/2013 | Shah et al. | |
| 8,521,740 B2 | 8/2013 | Henderson et al. | |
| 8,977,964 B2 | 3/2015 | Barraclough et al. | |
| 8,978,149 B2 | 3/2015 | Barraclough et al. | |
| 9,274,694 B2 | 3/2016 | Barraclough et al. | |
| 9,369,353 B2 | 6/2016 | Barraclough et al. | |
| 2002/0035697 A1 | 3/2002 | McCurdy et al. | |
| 2002/0091739 A1 | 7/2002 | Ferlitsch et al. | |
| 2004/0003097 A1 | 1/2004 | Willis et al. | |
| 2004/0003351 A1 | 1/2004 | Sommerer et al. | |
| 2004/0054627 A1 | 3/2004 | Rutledge | |
| 2004/0199527 A1 | 10/2004 | Morain et al. | |
| 2005/0210412 A1 | 9/2005 | Matthews et al. | |
| 2006/0048043 A1 | 3/2006 | Kikuchi | |
| 2006/0106874 A1 | 5/2006 | Victor et al. | |
| 2006/0136449 A1 | 6/2006 | Parker et al. | |
| 2006/0294051 A1 | 12/2006 | Kapadia et al. | |
| 2006/0294578 A1 | 12/2006 | Burke et al. | |
| 2007/0070442 A1 | 3/2007 | Ohkubo | |
| 2008/0109306 A1 | 5/2008 | Maigret et al. | |
| 2008/0195661 A1 | 8/2008 | Watson et al. | |
| 2009/0024698 A1 | 1/2009 | Ho et al. | |
| 2009/0030792 A1 | 1/2009 | Khivesara et al. | |
| 2009/0138357 A1 | 5/2009 | Riggs | |
| 2009/0216623 A1 | 8/2009 | Hendricks et al. | |
| 2009/0249217 A1 | 10/2009 | Narayanaswami | |
| 2009/0259971 A1 | 10/2009 | Rankins et al. | |
| 2009/0319925 A1 | 12/2009 | Katinsky et al. | |
| 2010/0094878 A1 | 4/2010 | Soroca et al. | |
| 2010/0095337 A1 | 4/2010 | Dua | |
| 2010/0106702 A1 | 4/2010 | Stumpf et al. | |
| 2010/0146146 A1 | 6/2010 | Welts et al. | |
| 2010/0175090 A1 | 7/2010 | Cordray | |
| 2010/0325086 A1 | 12/2010 | Skinner et al. | |
| 2011/0072078 A1 | 3/2011 | Chai et al. | |
| 2011/0080843 A1 | 4/2011 | Casey et al. | |
| 2011/0099071 A1 | 4/2011 | Johnson | |
| 2011/0161806 A1* | 6/2011 | Stern | G06F 17/211 |
| | | | 715/247 |
| 2011/0169860 A1 | 7/2011 | Ito | |
| 2011/0296291 A1 | 12/2011 | Melkinov et al. | |
| 2012/0147055 A1 | 6/2012 | Pallakoff et al. | |
| 2012/0197998 A1 | 8/2012 | Kessel et al. | |
| 2012/0210207 A1 | 8/2012 | Boss et al. | |
| 2012/0278725 A1 | 11/2012 | Gordon et al. | |
| 2012/0284290 A1 | 11/2012 | Keebler et al. | |
| 2012/0297302 A1 | 11/2012 | Barraclough et al. | |
| 2012/0317482 A1 | 12/2012 | Barraclough et al. | |
| 2013/0024757 A1 | 1/2013 | Doll et al. | |
| 2013/0081083 A1 | 3/2013 | Yu et al. | |
| 2013/0145306 A1* | 6/2013 | Shore | G06F 17/30905 |
| | | | 715/781 |
| 2013/0152011 A1* | 6/2013 | Pallakoff | G06F 3/0488 |
| | | | 715/784 |
| 2013/0198602 A1 | 8/2013 | Kokemohr | |
| 2014/0337322 A1 | 11/2014 | Cho et al. | |
| 2014/0365851 A1 | 12/2014 | Kroupa et al. | |
| 2015/0121181 A1* | 4/2015 | Joshi | G06F 17/211 |
| | | | 715/202 |
| 2015/0186860 A1 | 7/2015 | Rangarajan | |
| 2015/0193426 A1* | 7/2015 | Liu | G06F 17/2705 |
| | | | 704/9 |
| 2015/0193440 A1* | 7/2015 | Zhang | G06F 17/3053 |
| | | | 707/748 |
| 2015/0193495 A1* | 7/2015 | Zhang | G06F 17/278 |
| | | | 707/748 |
| 2015/0195379 A1* | 7/2015 | Zhang | G06F 17/30905 |
| | | | 709/219 |
| 2015/0212991 A1 | 7/2015 | Barraclough et al. | |
| 2015/0286383 A1* | 10/2015 | D'Aloisio | G06F 3/04847 |
| | | | 715/748 |

FOREIGN PATENT DOCUMENTS

| | | |
|---|---|---|
| EP | 1278364 | 1/2003 |
| EP | 1278364 A3 | 11/2004 |
| EP | 2823428 | 1/2015 |
| WO | 2008097624 | 10/2008 |
| WO | 2008097624 A2 | 10/2008 |
| WO | 2012018359 | 2/2012 |
| WO | 2012134549 | 10/2012 |
| WO | 2012158951 | 11/2012 |
| WO | 2012158951 A1 | 11/2012 |

OTHER PUBLICATIONS

Kon et al., "A New Digital Future for Publishers?", Oliver Wyman, Media Entertainment and Leisure, www.oliverwyman.com. Aug. 2010.

Chorianopoulos et al. "Cross Media Digital Rights Management for Online Stores" [online]. In: Proceedings of the First Int'l Conference on Automated Production of Cross Media Content for Multi-Channel Distribution 2005.

Sathish. "Delivery Context Access for the Mobile Web" [online]. Dated May 2007. Retrieved at: http://tutkielmat.uta.fi/pdf/lisuri00064.pdf.

Supplementary European Search Report for Application No. EP 12785780, dated Mar. 2, 2015.

"Cloud Mobile Media: Reflections and Outlook", Wen et al., IEEE Transactions on Multimedia, vol. 16, No. 4, pp. 385-902, Jun. 2014.

EPO Extended Search Report, European Patent Application No. 13757704.5 (dated Oct. 16, 2015), 2 pgs.

Story, G. A et al, "The Right Pages Image-Based Electronic Library for Alerting and Browsing," Computer, IEEE, vol. 25, No. 9 (Sep. 1992), pp. 17-25.

International Search Report, PCT Application No. PCT/US2015/066849 (dated Feb. 5, 2016).

Bansal, R. et al., "TWIPIX: A Web Magazine Curated from Social Media." Proceedings of the 20th ACM Int'l Conference on Multimedia, pp. 1355-1356 (Oct. 2012).

EPO Extended Search Report, counterpart European Patent Application No. 13757704.5 (dated Oct. 16, 2015), 2 pgs.

Hisashi Miyashita et al.; May 2007; W4A '07: Proceedings of the 2007 international cross-disciplinary conference on Web accessiblity (W4A); Publisher: ACM; pp. 126-127.

Kon M. et al., "A New Digital Future for Publishers?", Oliver Wyman, Media Entertainment and Leisure, www.oliverwyman.com. Aug. 2010.

Romil Bansal, et al.; "TWIPIX; a web magazine curated from social media"; Oct. 2012; MM '12: Proceedings of the 20th ACM international conference on Multimedia; Publisher: ACM; pp. 1355-1356.

Yonggang Wen, et al.; "Cloud Mobile Media: Reflections and Outlook"; Multimedia, IEEE Transactions on vol. 16, Issue: 4; DOI: 10.1109/TMM.2014.2315596; Jun. 2014; pp. 885-902.

* cited by examiner

GENERATION AND PRESENTATION OF AN OVERVIEW OF AN ELECTRONIC MAGAZINE ISSUE

FIELD

Aspects of various embodiments are directed to video generation and related media content access.

BACKGROUND

Various devices such as computers, tablets and hand-held devices (e.g., such as mobile telephones and smart phones) are used at a rapidly increasing pace to access magazine media including, for example, electronically-readable collections of articles which have been traditionally published in paper form. Some of the companies offering such electronic magazine media include, for example, Next Issue Media (NIM, or Texture) and Magzter. These and other companies provide user interfaces, typically on a subscription basis, which permit a user to access any of a multitude of different magazine issues. These types of services have been characterized in reviews as effectively Netflix for magazines, with each such service providing access to many thousands of magazine issues. With over a dozen articles often included in each magazine issue, facilitating a reader's preference to specific articles or magazine issues of interest can be an overwhelming task.

Unlike other electronically reviewable media services such as Netflix, electronic magazine services can be challenging to implement with features that are desirable for a variety of uses. Innate to the industry, specific magazine articles lack comparable third-party reviews that might lead a potential reader to consider reviewing the article and/or the magazine issue in which it is published. This is in contrast to a new movie or YouTube video which will typically be linked to third-party electronically-readable reviews which provide generic ratings or genre-specific ratings (e.g., four stars out of five, now trending, and a count of the number of views).

Also somewhat innate to the electronic magazine industry, the text-based form of articles published in magazine issues can be limiting from an interactive perspective. With so many different articles available to the potential reader and with the substance of each article somewhat buried inside each of these different articles, the electronic-magazine service provider is burdened to find a way to direct and maintain the reader's interest to each magazine issue and/or article inside the magazine issue sufficiently long so that the reader can capture this substance and experience benefit from the invested reading time.

It can also be challenging for electronic-magazine service providers to generate and provide access to each magazine issue in a timely manner. Consider, for example, an electronic-magazine service provider needing both to draw attention to a forthcoming magazine issue while also needing to pull together and properly format article metadata necessary to permit electronic access on behalf of many potential readers. This magazine metadata is often received by the electronic-magazine service provider in a form which includes both text and artwork and which needs to be preserved so as to maintain correspondence to hard-copy versions of the tangibly-distributed magazines. Unlike other electronically-reviewable video media services, information regarding forthcoming yet-to-published magazine issues (electronic or otherwise), as may be useful for drawing attention to potential readers, is generally limited. Without such comparable efforts to draw attention, distribution revenue can be insufficient to recapture publication costs.

These and other issues have presented challenges to content access for generating interest in electronic magazine articles/issues and the related services behind the generation and distribution of this type of media.

SUMMARY

Various example embodiments are directed to methods and apparatuses which address the above-discussed and other concerns involving the facilitation of reader interest in electronic magazine articles/issues and the related services behind the generation and distribution of media. Such media may include one or more of electronic magazine articles/issues, collections, feeds, and search results.

In accordance with one or more embodiments of the instant disclosure, such concerns are addressed by communicating content in each of a plurality of electronic magazine issues (e.g., a designated published issue and/or collections of articles that form a virtual issue) as follows. One of the magazine issues is identified for communications with a magazine reader, such as a prospective or actual magazine subscriber, and an issue cover is caused to be displayed at a user display device, over a user-communication interface medium. Such an approach may involve, for example, causing the issue cover to be displayed at the magazine reader's tablet or mobile phone, with communications via one or more of the internet and a mobile telephone network. The displayed cover has an issue name and a cover image, such as the name of an actual or virtual magazine, and a cover image pertaining to the magazine (e.g., to the publisher and/or to content in the magazine). A summary or overview of articles behind the issue cover are generated and subsequently displayed by autonomously causing the display of the issue cover to be replaced by a set of successive screen pages respectively corresponding to the articles behind the issue cover. Each of the successive screen pages includes imagery, which may include feature imagery, and article-characterization text. Such feature imagery may include, for example, a layered image with a subject, background and foreground images. These screen pages are different from pages in the article, in that they represent a cover type representation of each article.

In accordance with one or more embodiments, an apparatus includes first, second and third circuits, with the third circuit including a server, which operate to cause moving presentation of issue cover and article imagery for electronic magazine issues to be presented on a remote reader display. The first circuit is configured and arranged to provide issue cover imagery and article summary imagery for content from each of a plurality of electronic magazine issues by, for each electronic magazine issue, obtaining issue cover imagery for representation of the electronic magazine issue, having a cover image and title. For articles in the electronic magazine issue, a feature image and article-characterization text are identified from imagery and text associated with the article, and article summary imagery is generated, which includes the feature image and the article-characterization text. The second circuit is configured and arranged to provide moving display information for each of the electronic magazine issues by configuring the issue cover imagery and article summary imagery for moving display of a still image on a remote reader display utilized by a magazine reader. The third circuit is configured and arranged to cause moving presentation of the issue cover imagery and article summary imagery at remote reader displays for electronic magazine issues by, via a user-communication interface medium, causing display of issue cover imagery on the remote reader display, and further causing moving display of the article summary imagery by autonomously causing the display of at least a portion of the issue cover imagery to be replaced by a set of successive screen pages, each successive screen page respectively including the article summary imagery for one of the articles.

In accordance with other embodiments, such summary-like content is presented in a video-like form for each of a plurality of electronic magazine issues by one or more computers (CPU(s) or computer server(s)) generating and/or communicating this information based on magazine-issue metadata. For example, for communicating/distributing and generally providing access to the summary-like content, one of the plurality of electronic magazine issues is identified or tagged for communications with a magazine reader, whether a browser or a prospective/actual magazine subscriber. For this and each identified one of the plurality of electronic magazine issues, the computer(s) cause a display at the magazine reader's display device (via a user-communication interface medium or "user interface") of: an issue cover, the issue cover having an issue name and a cover image, a summary or overview of articles behind the issue cover by autonomously causing the display of the issue cover to be replaced by a set of successive screen pages respectively corresponding to the articles behind the issue cover, and each of the successive screen pages includes a feature image and article-characterization text.

For generation of such summary-like content, according to certain example embodiments, summaries or overviews of electronic magazine issues are created as follows. By a CPU (whether one or multiple working together), groups of feature images and article-characterization text are collected. Each group corresponds to one of the electronic magazine issues and is associated or linked with a set of articles and an issue cover. The collected groups are organized for display as successive screen pages respectively representing the issue cover and articles behind the issue cover, wherein the articles behind the issue cover are represented using a feature image and article-characterization text corresponding to the feature image. As may be implemented using a broadband network (e.g., Internet Cloud, cable or RF such as cellular, Wi-Fi or satellite), the collected groups for display are sent/broadcast as successive pages for communications of one of the plurality of electronic magazine issues with a magazine reader (e.g., a prospective or actual subscriber), wherein the collected groups are configured and arranged to be displayed at a user display device via a user-communication interface medium according to the successive screen pages.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1:
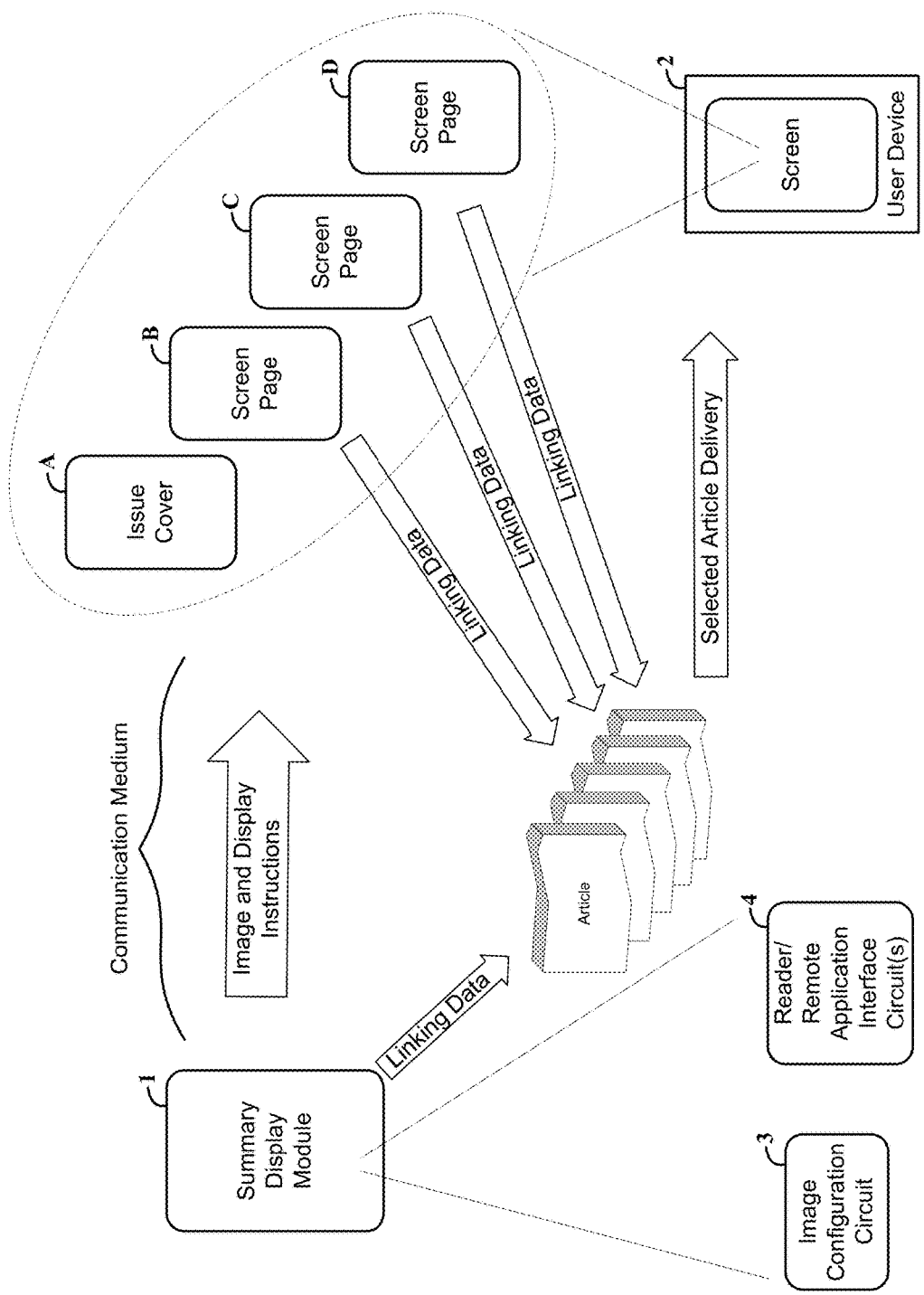
FIG. 1 shows an approach to generating and displaying user content, as may be implemented in accordance with one or more embodiments.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving presenting a video-like or video-based display of a magazine issue or issues, including a series of still images which may appear as though moving across the screen and which relate to a summary or table of contents (or contents/teaser overview) or other contents pertaining to articles therein one or more magazine issues. In certain implementations, aspects of the present disclosure have been shown to be beneficial when used in the context of the provision of electronic magazines or with collections of electronic media including text and images as may pertain to magazines or other electronic content. Various embodiments are directed to addressing issues related to conveying information about media content using limited resources (e.g., bandwidth, processing power, data storage), by providing images indicative of included content via screen pages, alleviating relevant issues (e.g., related to displaying video and/or needing to process an entire article or magazine). While not necessarily so limited, various aspects may be appreciated through a discussion of examples using such exemplary contexts.

According to various example embodiments, aspects of the present disclosure are directed to communicating content in each of a plurality of electronic magazine issues as follows. One of the plurality of electronic magazine issues is identified for communications with a magazine reader, which may involve a prospective or actual magazine subscriber. For the identified one of the plurality of electronic magazine issues and at a user display device (and via a user-communication interface medium), an issue cover is displayed having an issue name and a cover image. A summary or overview of articles behind the issue cover are displayed further displayed by autonomously causing the display of the issue cover to be replaced by a set of successive screen pages respectively corresponding to the articles behind the issue cover, each of the successive screen pages includes a feature image and article-characterization text. The successive screen pages may be provided by generating a video including moving still images on each of the successive screen pages.

The successive displays may be implemented using one or more of a variety of approaches. In some embodiments, each of the successive pages is displayed as a still image with movement depicted by at least one of the feature image and the article-characterization text moving across the user display device and then causing display of another of the successive pages to be displayed at the user display device. The screen pages may include imagery having multiple planes, in which each plane includes images, text, or a combination of both images and text. As such, each one or more images may be in a particular plane, text may be in another plane, or a combination of images and text may be in a common plane. Each plane can be separate from a plane that includes imagery and/or text for an issue cover.

In certain embodiments, display of a common aspect of the issue cover is maintained through one or more successive displays. For instance, the title of a particular magazine or a symbol representing that magazine (or its publisher) may be displayed on each page. A background may be presented, including one or more of text, image or color that is suggestive or otherwise indicative of the cover page. In some instances involving the display of such a common aspects, each of the successive pages is displayed as a still image with movement depicted by at least one of the feature image and the article-characterization text moving across the user display device. The display of another of the successive pages is also caused to be displayed at the user display device, in which the successive pages include a page corresponding to a text summary (or table) of the contents of the magazine issue. In another embodiment involving maintaining display of a common aspect of the issue cover, each of the successive pages is displayed as a still image with movement depicted by at least one of the feature image and the article-characterization text moving across the user display device, with another of the successive pages being caused to be displayed at the user display device and including hyperlink which, when selected, causes a display of a portion of an article that is linked to content presented at said at least one of the successive pages. In these and other contexts, a portion of an article may involve imagery, text, pages, or an entire article (a full portion), which may be tailored to display characteristics and article size.

The type of content displayed on the issue cover and/or successive screen pages can be tailored to suit particular applications. In some embodiments, the display of the issue cover includes a plurality of teasers, including a text and/or image feature, corresponding to at least one of the articles in the issue. The text and/or image feature is linked, by user selection, to said at least one of the articles in the issue.

The issue cover may include text along with an image, or only text, as implemented in accordance with various embodiments. The text can be associated with the cover image, and include a title of the electronic magazine, which can also be displayed with article-characterization text including a title of the article. The article-characterization text may also include a title of the electronic magazine, which can be useful in implementations where articles from disparate magazines are provided (e.g., as with a virtual issue, noted herein, such as with FIG. 1H).

Feature (e.g., "hero") images can be selected using a variety of approaches. In some embodiments, the images are selected based on analytics and to include one or more of identifying images with longest dwell time, image size, image quality, a combination of longest dwell time, image size, image quality, or a predefined image. Dwell time may be achieved from monitoring user accesses to the article. Various other analytics may also be used.

Live video, audio or other aspects may be added to displays as noted herein, to suit various applications. In some embodiments, audio is played with each of the successive screen pages, with the audio being different for each one of the screen pages and characterizing the content of the article to which the respective screen pages apply. Video, such as video embedded within a portion of an otherwise static screen page, can be similarly implemented with and/or without audio.

As noted above, issues can be displayed using content from multiple sources. In a particular embodiment, a virtual magazine issue having articles drawn from disparate magazine issues is identified for providing to a user. The issue cover for the virtual magazine includes a cover representative of a virtual issue and characterizing two or more of the disparate magazine issues included therein. This may, for example, include a cover for a particular magazine with articles from different issues within the magazine being displayed. As another example, this may include a cover indicative of articles from disparate magazines, which may further source from different publishers. Successive screen pages include respective screen pages from articles in different ones of the disparate magazine issues from which the feature image and article-characterization text are drawn. Issues may be selected for the virtual magazine based on one or more of: the magazine reader's subscriptions, user analytics of the magazine reader, and user analytics of other magazine readers having characteristics that are common to those of the magazine reader.

Other embodiments are directed toward manufacturing summaries or overviews of electronic magazine issues. At a CPU, groups of feature images and article-characterization text are collected, with each group corresponding to one of the electronic magazine issues associated or linked with a set of articles and an issue cover. The collected groups are organized for display as successive screen pages respectively representing the issue cover and articles behind the issue cover in which the articles behind the issue cover are represented using a feature image and article-characterization text corresponding to the feature image. The collected groups are sent over a network for display as successive pages for communications of one of the plurality of electronic magazine issues with a magazine reader (e.g., a prospective or actual subscriber). The collected groups are configured and arranged to be displayed at a user display device via a user-communication interface medium according to the successive screen pages.

In another embodiment, content in each of a plurality of electronic magazine issues is communicated as follows. A plurality of articles are identified from disparate ones of the electronic magazine issues, for communications with a magazine reader. For the identified articles, a virtual issue cover having an issue name and at least one cover image corresponding to one or more of the plurality of articles is communicated over a user-communication interface medium and caused to be displayed at a user display device. A summary or overview of articles behind the issue cover are displayed by autonomously causing the display of the issue cover to be replaced by a set of successive screen pages respectively corresponding to the articles behind the issue cover, each of the successive screen pages includes a feature image and article-characterization text corresponding to one of the articles. Issues for the virtual magazine may be selected based on one or more of: the magazine reader's subscriptions, user analytics of the magazine reader, and user analytics of other magazine readers having characteristics that are common to those of the magazine reader.

As may be implemented herein, a magazine (or electronic magazine) is defined as a collection of articles under a name/brand designated to represent an issue of the articles. Such issues may be implemented as a journal or journals. Such a magazine may paginate with each issue starting at a page (e.g., page one), or have pagination throughout a volume in which respective issues start at a page number that is successive to another issue (e.g., that continues through a period of time, such as a year). Further, a "user display device" is a user tool that includes circuitry and a screen, the circuitry and a screen configured to present information in visual form to the user. Examples of such a "user display device" include smart phones which include a display, CPU displays such as LCD, LED and the like, graphics tablets and other handheld user graphic communication tools.

Various embodiments involve reformatting media content having disparate formats, providing a common format from which renditions can be subsequently generated. Such an approach may, for example, involve formatting digital magazine issues from different content providers into a common format, and restructuring the common-format data into renditions that can be used to construct a new digital magazine having content from one or more of the content providers. These approaches are useful for interacting with disparate types of devices, disparate content sources and disparate end users, and addresses challenges relating to such interaction and processing of disparately-formatted data for a large number of users. Further, these approaches can be implemented for generating new digital magazine issues from disparately-formatted digital magazine issues provided by publishers, and can be done in a manner that is tailored to a multitude of specific users. This can be implemented, for example, by generating new magazine issues tailored to individual users, with each issue having content sourced from different source issues and/or different publishers. While not necessarily so limited, various aspects may be appreciated through a discussion of examples using this context.

In accordance with more particular embodiments, media content data such as digital magazine data is reformatted and restructured as follows. Different types of media content data having disparate formats are received from disparate content providers, in which the content corresponds to respective sets of media content. The media content data is reformatted into a common format type, such that all of the content received from the disparate content providers can be provided in a common format and, for example, stored for later access. Portions of the reformatted media content data are restructured to provide restructured renditions with an article-oriented structure defined by the common format type. This may involve, for example, generating article structure for content not having such structure, or generating article structure for the reformatted media content based on an article structure in the received sets of media content. This approach may also involve, for example, generating a single rendition or multiple renditions from one or more sets of media content received from a content provider.

For each restructured rendition, reformatted assets are generated based upon characteristics of a plurality of disparate device types, with each reformatted asset being specific to one of a plurality of disparate types of devices. These assets are portions of media content, and may include, for example, text, images, video, audio, and/or advertising material. Device-indeterminate ID linking data is generated, which links respective portions of each rendition with portions of the media content data having disparate formats (e.g., including data that can be used to identify the respective portions by storage location or other identification). The device-indeterminate ID linking data may, for example, link digital media content including at least one of articles, images, text and rich media content displayed on a user device, independent from the type of device upon which the at least one of images and text is displayed and independent from a page upon which the digital media content is displayed.

The linking data can be used in a variety of manners, to suit particular embodiments. For example, the linking data can be used to link user access back to original content, publishers, groups or other aspects of the original content. As such, portions of content can be linked to articles defined in (article) metadata, transitively linking articles across all renditions produced for a magazine issue (e.g., including instances in which publisher/input renditions have no article linking data). In these contexts, article metadata refers to and/or includes information in the form of identifying or characterizing data, such as data linking content to a source article or data expressly indicating information such as a publisher, issue or article title, as used to generate electronically-readable articles for magazine issues. The linking data can further ensure secure access to the restructured renditions, based on security or other authorization conditions tied to the original content. Moreover, access to the restructured renditions can be tracked and the linking data can be used to correlate the tracking to the original content. This tracking can be subsequently used in providing analytics and/or in generating one or more of renditions and new digital magazine issues. The linking data may also be used to link at least one of assets and a structural component of the media content that includes the assets. In some implementations, the linking data identifies digital media content, including at least one of articles, images, text and rich media content displayed on a user device, independent from the type of device upon which the digital media content is displayed and independent from a page upon which the digital media content is displayed.

Restructuring can be carried out in a variety of manners, and to suit a variety of needs. For instance, where each of respective sets of media content represents an original digital magazine issue received from one of the disparate content providers, the media content data can be restructured into respective reformatted digital magazine issues having content that mimics content in one or more of the original digital magazine issues. In some embodiments, both navigational data and page layout data for displaying text and/or images are generated for each rendition as part of restructuring. The linking data is then generated as data that links each page in each rendition to at least one article or page in one or more of the sets of media content from which the rendition was generated. In certain embodiments, an article-oriented structure is generated with a visual layout that corresponds to a visual layout of the respective sets of media content.

In various embodiments, restructuring includes accessing a library of the media content data in the common format type, and generating respective issues of electronic magazines from the media content data, based on the linking data and structuring information provided by one or more of the content providers that provide the accessed library of the media content data. This may involve, for example, generating respective virtual issues of electronic magazines from the media content data, based further upon data characterizing one or more users to which access to the virtual issues is provided. This data characterizing one or more users may be specific to a particular user or to a genre of users. In some implementations, this library-based approach involves a library including media content data for different issues of a common digital magazine to which the user has access, with a customized electronic magazine being generated from the library of media content data. Accordingly, such virtual issues may be generated using guidelines and/or instructions as may pertain to one or more of automated analysis or curation directed by a user, publisher and/or distributor.

Various embodiments further involve generating metadata for the media content data in the common format type, the metadata including information that characterizes the media content data as pertaining to a particular article within a digital magazine. This approach can be implemented by breaking articles in a digital magazine issue into subsets of content in each issue, with the subsets of content having the media content data in the common format type. Content boundaries are defined within the articles and portions of the media content data are restructured based on the boundaries. For instance, certain aspects of an article as pertaining to a particular image or set of images and text content may be designed for display on a common page, and can be restructured as such.

Various embodiments involve tracking user access to content and using that tracking in a variety of manners. In some embodiments, new portions of media content are identified from different ones of the respective sets of media content data based on tracked user accesses to respective articles in the restructured renditions. This identifying may, for example, include tracking access to the renditions by remote user devices. At least two articles of the media content data in the common format type are combined into a virtual magazine issue as part of the restructuring.

In certain embodiments respective portions of the restructured renditions are transmitted along with assets corresponding to the respective portion being transmitted, to users at remote user interface circuits. The transmission is based on, for each user, media content access authorization data for the user, the device-indeterminate ID linking data, and characteristics of the remote user interface circuit via which the user accesses the media content. Access to the restructured renditions can also be tracked in this context, and new portions of the restructured renditions can be identified from different ones of the respective sets of media content based on the tracking, the media content access authorization data and characteristics of the remote user interface circuit. Restructured renditions corresponding to the identified portions of the restructured renditions are combined into a data set providing a digital magazine, which is presented to a user via the remote user interface circuit. Transmitting the restructured renditions in this context may be carried out based on transmission initiation data received from the remote user interface circuit, which identifies the portions of the media content sets. This initiation data may, for example, be initiated in response to user-inputs requesting viewing of portions of media content sets, or automatically initiated by a device based upon user settings.

Various embodiments involve reformatting respective sets of media content representing digital magazine issues received from the disparate content providers, into a common (e.g., canonical) format. The restructured renditions may be combined to effectively combine articles from different ones of the digital magazine issues into a virtual digital magazine issue. Various embodiments are directed to reformatting disparate sets of original media content into reformatted media content having a common format, and restructuring the reformatted media content. This restructuring may, for example, involve constructing an electronic magazine type article from the reformatted media content, with layout derived from the original media content. In some implementations, a rendition is reformatted from a source format such as PDF (portable document format from Adobe), Adobe Folio, OFIP (Open Format for Internet Publications by Woodwing), an electronic book format such as ePub of the International Digital Publishing Forum, and HPUB (form the open source Baker Framework or Friar Framework) to a common canonical format. This approach can facilitate restructuring at a later time, using reader-type components that may operate to recognize/process a single content format. For instance, such a reader-type component may be programmed to process only the common canonical format, simplifying the componentry and facilitating reliability.

Restructuring may be carried out in a variety of manners. In some embodiments, content tools restructure a rendition by mapping a native document structure defined by the format of the original media content, to an article-oriented structure defined by the common canonical format. Each article in resulting output content represents a discrete unit of editorial content (e.g., as defined by the publisher of the original media content), and maps some subset of the reformatted media content to the original media content. In some implementations involving magazine content, subsets are determined by matching input content features with features from a set of article metadata records whose features are common to all renditions of a magazine issue. Restructuring content according to article metadata allows the construction of an article catalog upon which many features may rely, such as full-text search, recommendations, bookmarking, sharing, deep linking, and fine-grained reporting and analytics.

Accordingly, restructuring may involve accurately identifying content elements that constitute each article in a rendition of an issue, associating constituent article content with article metadata that is common to all renditions of the issue, and relating equivalent content articles from different renditions of an issue to one another via a globally unique rendition independent identification (e.g., a UUID) that is mathematically derived from a globally unique name determined by the common metadata. Article metadata, in this context, may be provided in an original set of content received from a publisher, or generated for content that has no metadata or as new metadata for content having metadata. Where content having metadata is received along with another version of that content not having metadata, the former content metadata can be used in defining metadata in the latter. In some implementations, content tools restructure source content to define articles, using a constraint that specifies that a degree (or all of) the presentation structure (visual layout) of original content shall be preserved.

A variety of components of media content can be restructured, involving some or all of a set of content. In various embodiments, input formats are used to define a specific presentational model to be applied to a resulting restructured document structure. The details of the presentational model may vary between formats. For example, a PDF document may have a linear sequence of pages, where each page is a discrete and individually addressable unit of information display. A page may be identified by a 1Based index that corresponds to its offset within the linear sequence. An Adobe Folio document may have a linear sequence of content stacks, each of which is a discrete and individually addressable unit of information display. A user can navigate the content stacks sequentially by horizontally scrolling between stacks. Each content stack includes one or more background assets (e.g., which may be laid out vertically or horizontally). A variety of static and interactive overlays such as images, video, audio, and slideshows may exist over the background assets. A content stack can be identified by a text "localID" property that is unique.

One or more embodiments herein may be implemented in connection with one or more aspects shown and/or described in: U.S. patent application Ser. No. 13/474,432, PCT Patent Application No. PCT/US2012/038406; U.S. patent application Ser. No. 13/415,157; and U.S. patent application Ser. No. 13/439,665, all of which are fully incorporated herein by reference. For instance, various rendition-based aspects may be implemented with systems and approaches such as one or more of the apparatus(es) shown in FIGS. 1A-1D of U.S. patent application Ser. No. 13/474,432 (e.g., with stored content in one or more renditions) and similar aspects of PCT Patent Application No. PCT/US2012/038406. In addition, various embodiments may be implemented with usage-based tracking and content provision as described in U.S. patent application Ser. No. 13/415,157 (e.g., as in FIGS. 1A-1D). One or more embodiments may also be implemented in connection with content delivery and related presentation of available media (e.g., with creation and management of renditions of that content), such as described in U.S. patent application Ser. No. 13/439,665 (e.g., as shown in and described in connection with FIGS. 1 and 3).

One or more embodiments are directed to a system having a storefront, such as described in U.S. patent application Ser. No. 13/474,432. The storefront may provide a website with catalog-type purchasing functions, such as may be amenable to a magazine rack. Users can select issues, or a library of issues, and the storefront may identify what issues a user can access as well as accounting aspects and related user entitlement. For instance, an issue cover can be displayed as noted herein to represent a magazine issue of the storefront, with subsequent screen pages being implemented to provide subscription access to the content. Various remote user devices can access the storefront, and a content delivery system provides content to the user devices based upon activity in the storefront (e.g., with content being stored in cloud storage with a content delivery network in front of it using an edge cache).

Various aspects are directed to bringing content into a content delivery network and system, and making content, such as a magazine issue, available in such a storefront catalog. An input file from a publisher for respective media content includes assets (e.g., media such as text, images and/or video) and metadata that attributes the assets to a page. This information is pushed to a content delivery network, and catalog-related information is pushed to a storefront catalog served by the content delivery network.

Media content received from disparate publishers is formatted into a common format for use and for rapid loading for media-rich content, such as magazine content having embedded video or audio. The common format is transformed into one or more renditions, each rendition including assets (e.g., a set of content), which may be presented in two or more formats for each asset. For instance, each format may be device-specific and scaled based upon aspects of the device from which the content is requested for delivery and access (and, e.g., storing). In this context, a single data format/rendition can be used to generate respectively scaled versions of the content that are amenable to use on disparate devices with different requirements, which can be carried out on an asset-by-asset basis. For instance, a rendition can be generated with two or more different versions of respective assets therein, such that the rendition is amenable to access on disparate devices, each rendition utilizing a different one of the respective versions. Accordingly, a single rendition can support multiple display resolutions (such as a standard definition and a high-definition display) and image formats (e.g., raster and PDF). For instance, each rendition can be implemented on devices with different display resolutions, aspect ratios, and page layout and the size of the assets that are optimized for each device. Such an approach facilitates rapid load times, and desirable storage of relevant data. In certain embodiments, the common format includes information for loading on remote devices in an order based on which aspects are to be displayed first. In some embodiments, media content is stored with rendition-independent IDs, such that each rendition can be linked to a particular set of content that can be accessed on different devices.

In various contexts, the term rendition characterizes an input rendition provided by a publisher. Each input rendition is converted to a common-format output rendition that contains logical assets, each of which contains one or more physical assets which vary on scale and format. Publishers may provide multiple input renditions for an issue, in which case each input rendition can be processed individually (and, e.g., using common metadata for linking the article structures of each rendition).

In some embodiments, renditions are made for several target configurations known for particular devices, with the respective configuration stored in a matrix corresponding to a parent set of common format-data. This approach can be implemented, for example, by storing multiple physical assets in a matrix corresponding to logical assets. For instance, for certain high-definition devices, large-scale or high-definition assets corresponding to logical assets of media content may be sent through to end users. For devices operating at lower definition and accessing the same media content, small-scale or low-definition assets corresponding to the same logical assets can be sent to end users. These approaches may, for example, be carried out using a parser function to parse content and identify characteristics, such as scaling, to be performed based on a size and/or type of assets detected in the content, or other characteristics such as device type or communication connection type.

In addition to scaling as relating to resolution, the format of the respective assets in each rendition, or the format of the renditions themselves, may also be set for the respective devices on which each rendition is to be accessed. For instance, for media content pertaining to a set of assets, metadata that describes aspects of the content such as page layout of magazine-type content is configured with information that models the layout using the different assets. Such an approach can be carried out in various manners, such as by tailoring the resulting scaling and/or format of assets to access and display characteristics and, in some embodiments, characteristics of available delivery channels (e.g., quality of wireless connection via which the content is provided). For instance, some devices may be amenable to displaying certain resolutions of documents formatted in a PDF format available from Adobe, and related assets can be scaled accordingly relative to resolution. For the same target content, devices that do not support such a format may be served by generating another data format type, such as JPEG or PNG, at respective scaling.

Accordingly, different scaled versions of a particular asset, along with information for presentation of content (e.g., display of information, play audio or play video), can be targeted to specific devices. Each asset may contain a series of asset descriptors each of which is a physical asset that has an asset class. Such assets may, for example, be bundled or left unbundled for delivery, such as to group portions of a media content file or portions of different files. For instance, if a page has a video file, such as a 10 megabyte file, with other aspects in the page being 1-2 megabytes, such a video file can be unbundled from the rest of the page such that the rest of the page can be delivered and displayed first and quickly (e.g., in a single bundled archive that can be retrieved with a single request), with the video file being presented later. In some implementations, a place holder or a poster image is displayed in place of the video file until it is delivered and/or until a user requests delivery.

Various embodiments involve circuit-based methods and/or apparatuses, as exemplified by examples herein, with methods and/or apparatuses being directed to, including and/or involving different types of media content data having disparate formats and corresponding to respective sets of media content received from disparate content providers, and efforts to develop therefrom a common format type. Portions of the media content data are sent to users at remote user interface circuits, using one or more of transmission initiation data that identifies the portions of the media content, media content access authorization data, and/or characteristics of the remote user interface circuit via which the user accesses the media content. For at least one user or entity that sends data indicating a request to access at least a subset of the portions of the media content data, media content data is combined in a common format, and at least some of the portions of the media content data are provided in a combined data set in response to the user or entity. The combined data set is presented to the user via the remote user interface circuit accessed by the user. Such an approach may involve generating a virtual electronic magazine issue, which has portions of two or many individual media content sources.

Various embodiments are directed to a method including, or an apparatus to perform, steps involving formatting different types of media content data having disparate formats and corresponding to respective sets of media content received from disparate content providers, into a common (e.g., canonical) format type. This approach may involve reformatting media content issues such as electronic magazine issues, received from disparate publishers. Respective portions of the media content data, as provided by different ones of the content providers, are transmitted in the common format type to users at remote user interface circuits. The transmission is based on, for each user, transmission initiation data from the user interface circuit, media content access authorization data for the user (e.g., subscription data), and characteristics of the remote user interface circuit via which the user accesses the media content. The transmission initiation data may, for example, identify portions of the media content sets requested by or accessed by the user interface circuit, and may be initiated in response to user-inputs requesting viewing of portions of media content sets or automatically by the user interface circuits or other circuitry. Access to the transmitted portions of the media content data is tracked. For each user, new portions of media content from different ones of the respective issues are identified based on the tracking, the media content authorization data and characteristics of the remote user interface circuit. Media content data in the common format corresponding to the identified new portions of media content is combined into a combined data set, such as a virtual media content issue (e.g., virtual magazine issue). The combined data set is presented to the user via the remote user interface circuit (e.g., to a user's device, such as a smart phone, personal computer or tablet).

In various embodiments, sets of disparately-formatted media content are reformatted into corresponding renditions of media content having a common format by restructuring portions of the media content data in a common format type into an article-oriented structure defined by the common format type. Restructuring may include, for example, generating an article-oriented structure having a visual layout that corresponds to a visual layout of the respective disparately-formatted media content. The common format includes device-indeterminate ID linking data that links respective portions of each rendition with the common format to corresponding portions of the disparately-formatted media content. The respective portions may, in this context, include one of assets and a structural component of the media content that includes the assets. Reformatted assets are generated for each rendition, with each reformatted asset being specific to one of many disparate types of devices, and being reformatted based upon characteristics of the disparate device types. Access to the portions of disparately-formatted media content and assets therein is tracked based on the linking data.

One or more embodiments characterized herein may be implemented in connection with and/or otherwise using embodiments in U.S. Provisional Patent Application Ser. No. 62/248,938 entitled "Content Rendition Generation and Control," to which priority is claimed and which is fully incorporated herein by reference. Similarly, one or more embodiments characterized herein may be implemented in connection with and/or otherwise using embodiments in U.S. patent application Ser. No. 14/681,911, entitled "Content Rendition Generation and Control," to which priority is also claimed and which is fully incorporated herein by reference. For instance, various embodiments characterized in similar figures in these referenced patent documents, and claims therein supported by those figures, can be implemented in accordance with embodiments herein.

In a further embodiment, a first circuit provides display imagery for articles in a plurality of electronic magazine issues by, for each article, identifying a feature image and article-characterization text from imagery and text associated with the article, and generating article summary imagery that includes the feature image and the article-characterization text. The article summary imagery for each article may, for example, be generated by selecting the feature image based on metadata or analytics characterizing one or more of image size, image quality, image dwell time of one or more magazine readers viewing the article with which the feature image is associated, and the selection can thus be automated. As such, each article is provided with one or more images and/or layers with one or more images, which assist a potential magazine reader in ascertaining the content of the article, and therein garnering interest in reading the article. A second circuit presents overviews of electronic magazine issues to be presented on remote reader displays by, for each electronic magazine issue to be presented on a particular remote reader display, causing display of issue cover imagery for the electronic magazine issue on the remote reader display, and causing moving display of the article summary imagery for the electronic magazine issue. In particular, the display of at least a portion of the issue cover imagery is autonomously replaced by a set of successive screen pages, with each successive screen page respectively including the article summary imagery for one of the articles in the electronic magazine issues. Article imagery can thus be presented with cover imagery to provide a magazine reader with a visual indication of content in the magazine issue (or virtual issue).

Display of the successive screen pages and related moving imagery can be effected in a variety of manners. In some embodiments, the second circuit maintains display of a common aspect of the issue cover imagery in a first image layer while displaying each of the successive screen pages in one or more additional image layers, therein providing automated engagement with the magazine reader via moving display of the article summary imagery relative to the issue cover imagery. In certain embodiments, each screen page is displayed as one or more still images with movement depicted by at least one of the feature imagery and the article-characterization text moving across the remote reader display, after which another of the successive screen pages is displayed at the remote reader display.

In accordance with one or more embodiments, an apparatus includes circuitry including a first image configuration circuit, a second reader-configuration circuit, and a third remote application interface circuit, that operate to cause moving presentation of issue cover and article imagery for electronic magazine issues to be presented on a remote reader display. The first (image configuration) circuit provides issue cover imagery and article summary imagery for content from each of a plurality of electronic magazine issues as follows. For each electronic magazine issue, issue cover imagery is obtained for representation of the electronic magazine issue, including a cover image and title. For articles in the electronic magazine issue, a feature image and article-characterization text are identified from imagery and text associated with the article, and article summary imagery that includes the feature image and the article-characterization text is generated and provided as an output for use on a remote reader display.

The second (reader-configuration) circuit provides moving display information for each of the electronic magazine issues by configuring the issue cover imagery and article summary imagery for moving display of a still image on a remote reader display utilized by a magazine reader. The third (remote application interface) circuit causes moving presentation of the issue cover imagery and article summary imagery for each electronic magazine issue to be presented on the remote reader display, by causing display of the issue cover imagery on the remote reader display and subsequently causing moving display of the article summary imagery. Specifically, the second circuit autonomously causes the display of at least a portion of the issue cover imagery to be replaced by a set of successive screen pages, with each successive screen page respectively including the article summary imagery for one of the articles. This autonomous display can be effected via a user-communication interface medium, such as a network as may include the internet and/or a mobile telephone network. Further, displaying the issue cover imagery may include causing the display of issue cover imagery and text on separate image planes. For instance, multiple image planes may be displayed on the remote reader display, with each plane including images, including text, or including a combination of images and text.

The first (image configuration) circuit may be implemented in a variety of manners, to suit particular embodiments. In some embodiments, the first circuit generates the article summary imagery for each article by selecting the feature image based on analytics characterizing one or more of image size, image quality, and/or image dwell time of at least one magazine reader viewing the article with which the feature image is associated, or a combination thereof. For instance, analytics as characterized herein can be used to identify an image in an article that is popular amongst magazine readers, and also meets other characteristics such as minimum resolution, or perhaps satisfies other (e.g., weighted) factors such as may pertain to content of the image (e.g., if the image includes a person's face). The article summary imagery may also be generated by selecting the feature image and the article-characterization text from imagery and text associated with the article, based on metadata for the article (e.g., metadata for an image, and related text) In certain embodiments, the first circuit embeds a hyperlink within the feature image and/or the article characterization text, and the third circuit responds to a magazine reader selecting the embedded hyperlink via his/her remote reader display by causing display of a portion of the article corresponding to the article summary imagery at the remote reader display.

In some embodiments, the first circuit obtains the issue cover imagery for a virtual magazine issue having articles drawn from disparate electronic magazine issues, and the third circuit causes the display of the issue cover imagery by causing display of cover imagery representative of the virtual magazine issue and characterizing two or more of the disparate electronic magazine issues. For instance, a virtual issue may be created for a user, and including top-rated articles from two or more magazine publications to which the user subscribes. These publications may be for a common magazine, or from disparate magazines. The third circuit causes the moving display of the article summary imagery by displaying respective screen pages for the articles from different ones of the disparate magazine issues from which the feature image and article-characterization text are drawn for the articles. In some implementations, the first circuit populates the virtual magazine with articles by selecting the articles from the disparate electronic magazine issues based on one or more of: subscriptions of the magazine reader, user analytics associated with the magazine reader, and user analytics associated with other magazine readers having characteristics that are common to those of the magazine reader. Such approaches may involve analytics-based aspects as characterized further herein.

The second circuit may also be implemented in a variety of manners. In various embodiments, the second circuit configures the issue cover imagery and article summary imagery for moving display of the still image by generating a video including moving still image layers for each of the successive screen pages. Each still image layer may, for example, include both an image and text from an article, or be specific to each image and/or text that is utilized for the screen page in which two image layers are used for each screen page. The second circuit may configure the issue cover imagery and article summary imagery by providing a background that includes a title of the electronic magazine issue for each screen page.

In certain embodiments, the second circuit stores the configured issue cover imagery and article summary imagery in the server, for use in later providing the cover imagery and article summary imagery to a remote magazine reader. The third circuit transmits the issue cover imagery and the article summary imagery from the server to the remote reader display over a user-communication interface medium, and controls an application running on the remote reader display to manipulate imagery displayed at the remote reader display. As such, the pre-configured imagery can be used to generate the moving interface on the remote reader display on the fly, which may also involve selecting which articles to display (e.g., from a single magazine issue or as part of a virtual issue as noted herein).

Further, the third circuit is also implemented in a variety of manners to suit particular applications. As may be implemented with one or more embodiments, the third circuit causes the display of the issue cover imagery to be replaced by the set of successive screen pages by maintaining display of a common aspect of the issue cover imagery in a first image layer while displaying each of the successive screen pages in a second image layer. This provides automated engagement with the magazine reader via moving display of the article summary imagery relative to the issue cover imagery. The third circuit may also cause the display of each of the successive screen pages as one or more still image layers, with movement depicted by at least one of the feature image and the article-characterization text moving across the remote reader display. Each screen page may be displayed as a still image with movement depicted by at least one of the feature imagery and the article-characterization text moving across the remote reader display, after which another of the successive screen pages is caused to be displayed at the user display device. The issue cover imagery may include teaser imagery having a text and/or image feature corresponding to at least one of the articles in the issue, and embedding within the text and/or image feature a hyperlink that, when selected by the magazine reader, causes display of said at least one of the articles in the issue. In certain embodiments, the third circuit causes audio payback while each of the successive screen pages is presented, with the audio being different for each one of the screen pages and characterizing the content of the article to which the respective screen pages apply.

In some embodiments, the third circuit causes the moving display of the article summary imagery based on user-specified article presentation preferences provided by the magazine reader. Such user-specified article presentation preferences may, for example, specify one or more of a rate of speed of display of the articles, sequencing of the articles, and a combination thereof.

Turning now to the figures, various embodiments are shown and described therein, and may be implemented with one or more embodiments herein. For instance, FIG. 1 shows an embodiment involving the generation of data representing a magazine issue. At block 1, as may be implemented with a magazine summary (or contents teaser/overview) display module, one of a plurality of electronic magazine issues is identified for communications with a magazine reader. For an identified electronic magazine issue, the summary display module causes, via image and display instructions communicated over a communication medium, display of an issue cover "A" at a user device 2. The issue cover includes information such as an issue name and a cover image, or other imagery indicative of the magazine issue.

Successive screen pages B, C and D are then caused to be displayed on the user device 2 by the summary display module, with fewer or more screen pages used to suit particular embodiments. Each screen page displays a summary or overview of an article behind the issue cover. The screen pages are caused to be displayed by autonomously causing the display of the issue cover to be replaced by a set of the successive screen pages respectively corresponding to the articles behind the issue cover. Each of the successive screen pages includes a feature image and article-characterization text. This image and/or text is linked via linking data back to an article, to which the summary display module is also linked. In this context, the summary display module can configure the image and display instructions with appropriate linking data therein, to link each screen page back to the article that it represents.

In various embodiments, the issue cover and screen page is extracted from an issue or issues to facilitate rapid communication and access thereto, prior to providing and/or while delivering more detailed aspects of the issue or article(s) to the user device 2. Such an approach addresses issues including those noted in the background above, as relate to providing more detailed content such as an entire magazine article, or video requiring relatively high bandwidth. As such, an eye-catching overview can be provided without requiring lengthy download times, as may be relevant for video or other rich media. Further, the screen pages and cover pages noted herein translate visually to magazine covers. In some instances, still images regarding one or more aspects to be displayed are rapidly communicated to the user device 2, and an application running on the user device carries out the summary display module functions and generates one or more of the issue cover, screen pages, and/or movement/display thereof. This approach can also facilitate the provision of "teaser" content for articles and/or issues yet to be released, drawing from early releases of portions of an issue by publishers. Such an approach can also be used in conjunction with the embodiments characterized in the context of FIG. 1D below.

In various implementations, the summary display module 1 is implemented with circuitry, including an image configuration circuitry 3 and reader/remote application interface circuitry 4. The reader/remote application interface circuitry 4 can be implemented with separate reader-configuration and remote application interface circuits.

In a particular embodiment involving FIG. 1, a first circuit including the image configuration circuitry 3 provides display imagery for articles in a plurality of electronic magazine issues by, for each article, identifying a feature image and article-characterization text from imagery and text associated with the article, and generating article summary imagery that includes the feature image and the article-characterization text. As such each article is provided with one or more image layers that assist the potential magazine reader in ascertaining the content of the article, and therein garnering interest in reading the article. A second circuit including the reader/remote application interface circuitry 4 presents overviews of electronic magazine issues to be presented on remote reader displays by, for each electronic magazine issue to be presented on a particular remote reader display, causing display of issue cover imagery for the electronic magazine issue on the remote reader display, and causing moving display of the article summary imagery for the electronic magazine issue. In particular, the display of at least a portion of the issue cover imagery is autonomously replaced by a set of successive screen pages, with each successive screen page respectively including the article summary imagery for one of the articles in the electronic magazine issues. Accordingly, the various article imagery is presented in connection with cover imagery, such as in layers, to provide a magazine reader with a visual indication of the magazine issue content. In this context, magazine issue content may pertain to a specific magazine issue publication, or a virtual magazine issue that is generated with a collection of articles from different magazine publications.

In a further embodiment, the apparatus in FIG. 1 is implemented with a first circuit including image configuration circuitry 3, and second and third circuits implemented with circuitry of the reader/remote application interface circuitry 4. The first circuit provides issue cover imagery and article summary imagery for content from each of a plurality of electronic magazine issues having a cover image and title. For articles in the electronic magazine issue, the first circuit identifies a feature image and article-characterization text from imagery and text associated with the article, and generates article summary imagery that includes the feature image and the article-characterization text. The second circuit carries out reader-configuration functions to provide moving display information for each of the electronic magazine issues by configuring the issue cover imagery and article summary imagery for moving display of a still image on a remote reader display utilized by a magazine reader. The third circuit carries out remote application interface functions, using server, by causing moving presentation of the issue cover imagery and article summary imagery at the remote reader display for each electronic magazine issue via an interface medium (e.g., the internet). The issue cover imagery is displayed on the remote reader display and autonomously replacing at least a portion of the issue cover imagery with a set of successive screen pages, each successive screen page respectively including the article summary imagery for one of the articles.

Figure 1A:
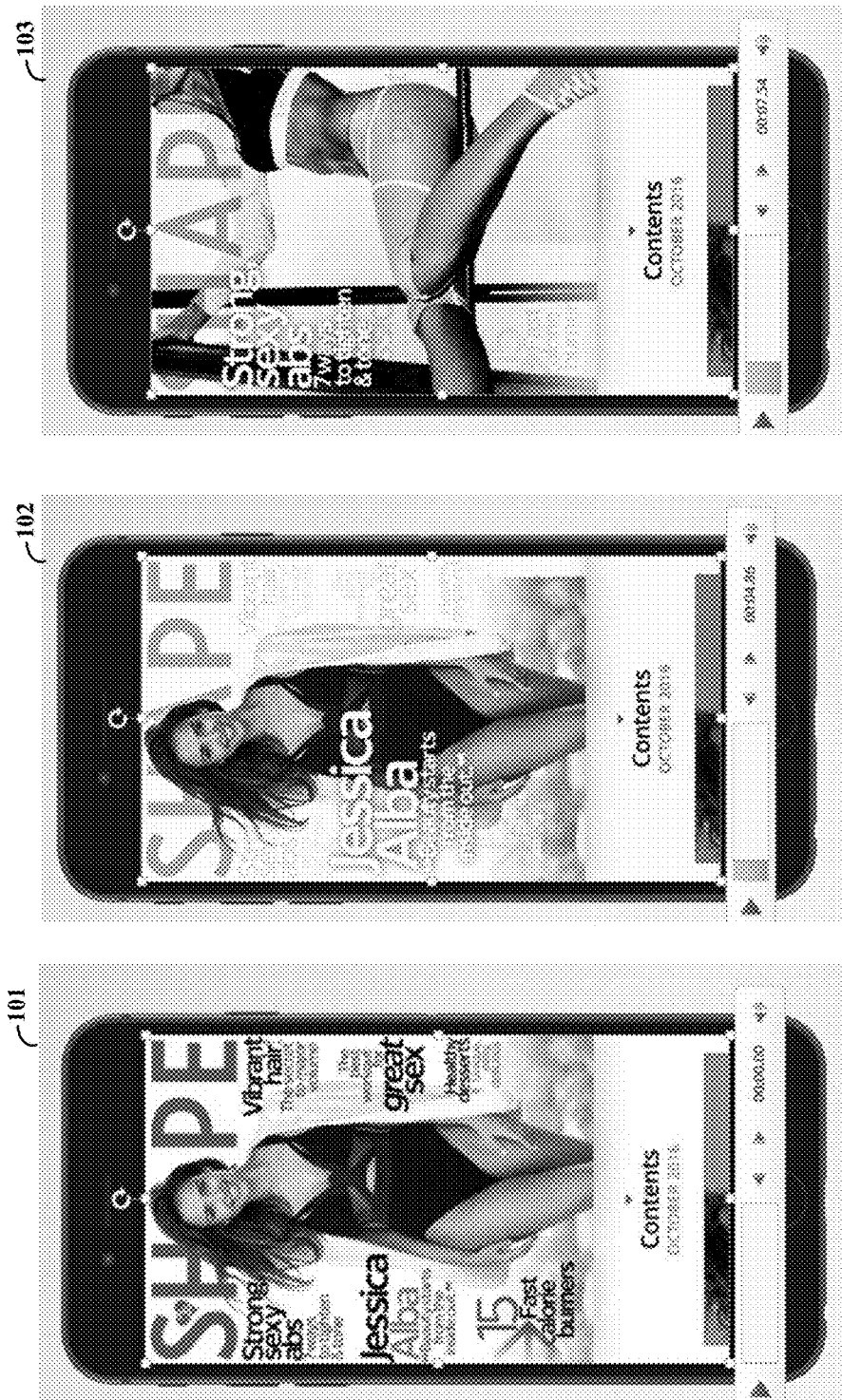
FIGS. 1A, 1B and 1C show successive screen shots of a user device implemented with the display of media content, as may be implemented with one or more embodiments.
Figure 1B:
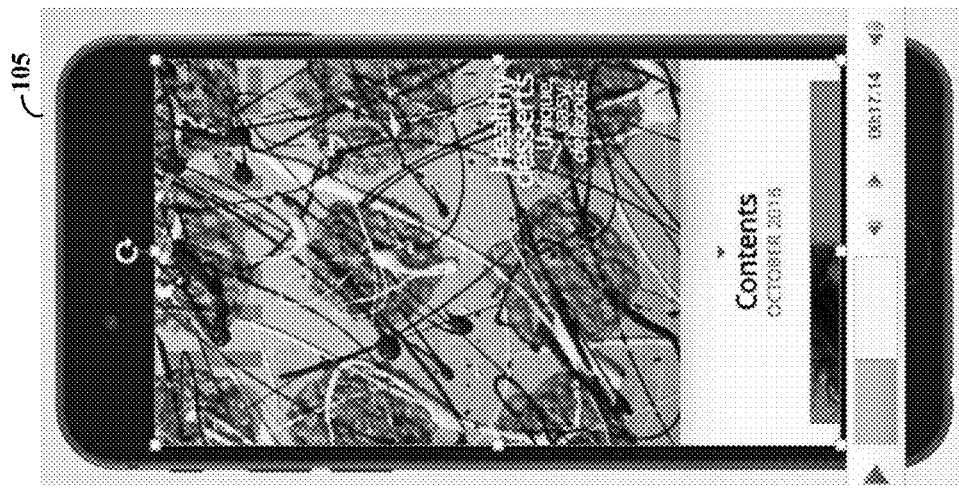
Figure 1B:
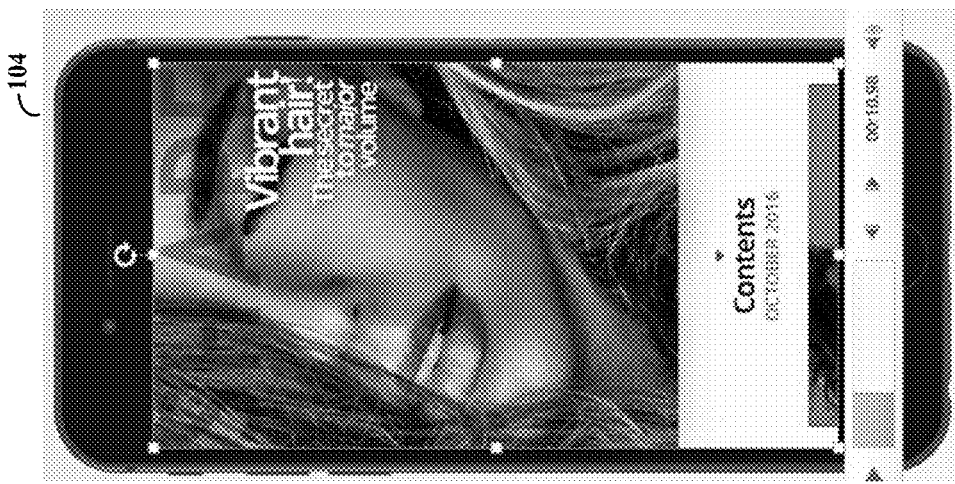
Figure 1C:
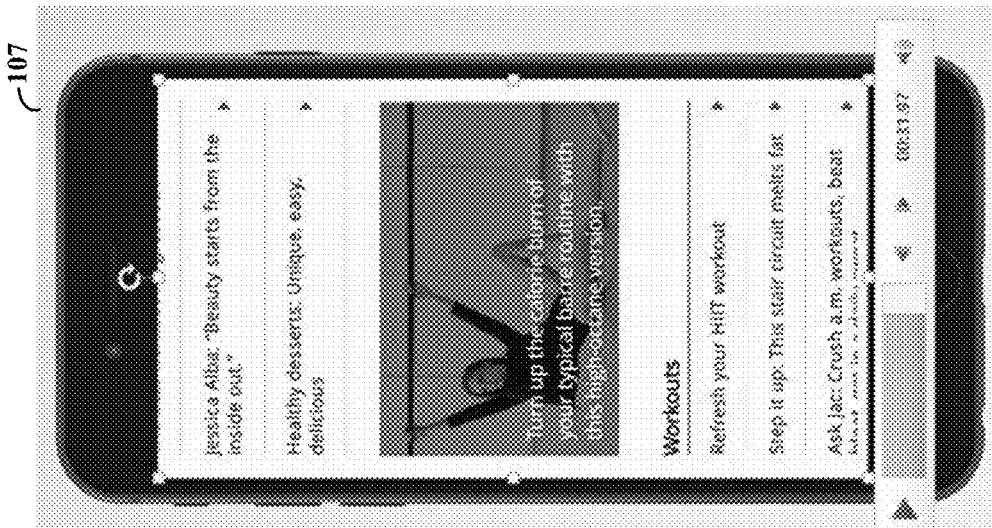
Figure 1C:
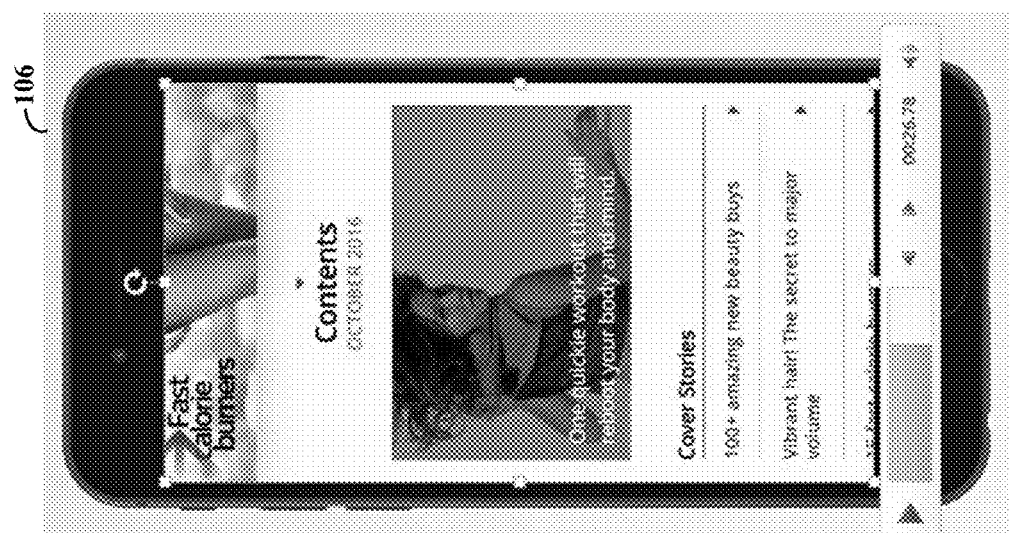

FIGS. 1A, 1B and 1C show successive screen shots of a user device implemented with the display of media content, as may be implemented with one or more embodiments, each with a summary or contents/teaser overview pertaining to articles in one or more magazine issues. At FIG. 1A, an issue cover is displayed at 101, with a title of an electronic magazine issue in the background as well as text corresponding to articles within the issue, and a cover image. At 102, a successive screen page is shown, with the title as a background ("SHAPE") along with an image and text corresponding to one of the articles. In this instance, the image (e.g., a hero image) is the same image as that displayed with the issue cover at 101. The text displayed at 102 characterizes the article to which the screen page refers. Additional successive screen pages are shown at 103 of FIG. 1A, and at 104 and 105 of FIG. 1B. Each of these screen pages includes an image and text pertaining to the particular article represented by the screen page. For instance, an article on Jessica Alba represented at 102 is characterized by an image of her, an article on "abs" is characterized at 103 by an image of abs, an article on "vibrant hair" is characterized at 104 by an image of hair, and an article on "healthy desserts" is characterized at 105 by an image of dessert.

The order and nature of the display of these screen pages may be tailored to suit particular embodiments. In some instances, the order follows a predefined order, such as an order in a table of contents. In other instances, the order is selected based on an expected level of interest from a particular user. For instance, using the above example, if analytics show that a user is interested in exercise more than food, the article on "abs" shown in 103 of FIG. 1A may be shown before the article on "healthy desserts" at 105 in FIG. 1B. In some instances, a cover story is presented first, followed by an ordered presentation of additional stories, such as by working clockwise or counter-clockwise on articles depicted spatially around the cover.

At FIG. 1C, a listing of a table of contents is shown at 106 and 107, as may be accessed by scrolling down from one of the screen pages. While such an application is not necessarily required, it can facilitate the display of and interaction with articles. As shown at 106, the article concerning "vibrant hair" from the screen page at 104 of FIG. 1B can be selected. As shown at 107, the article concerning "healthy desserts" as shown at screen page 105 of FIG. 1B can be selected.

Further contents may also be shown, and can be tailored to a particular screen page. For instance, a user swiping up on the screen page showing the article concerning "abs" at 103 of FIG. 1A may be presented with a table of contents including a selection for that article, but also including selections for other fitness-related articles. Such articles may or may not be from the magazine issue corresponding to the cover page shown at 101 of FIG. 1A.

Figure 1D:
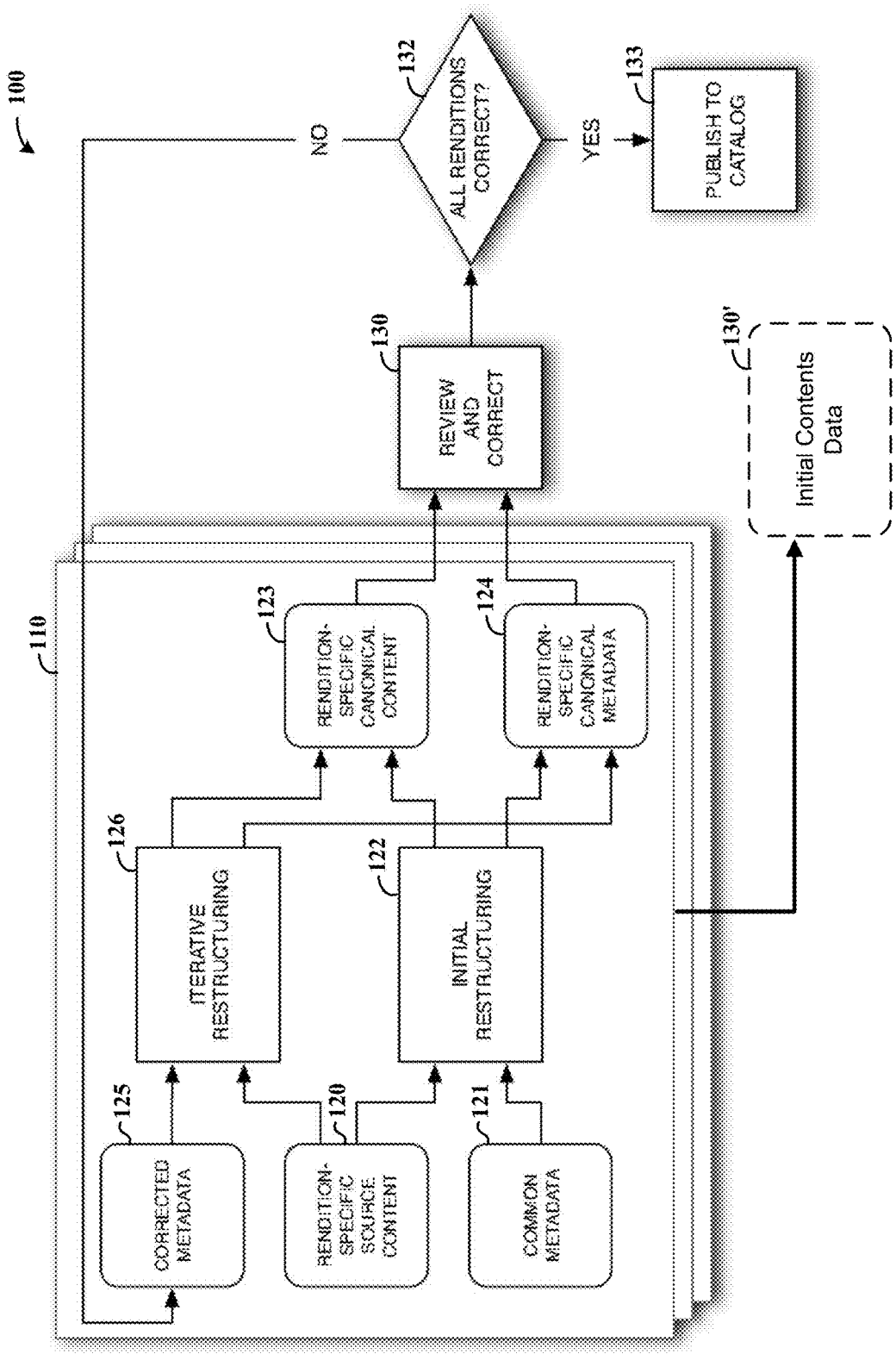
FIG. 1D shows a high-level overview of an apparatus and/or method, as may be applicable to one or more embodiments.

FIG. 1D shows a high-level overview of an apparatus and/or method 100, as may be applicable to one or more embodiments (e.g., with iterations 110 thereof implemented for different resulting publications). Rendition-specific source content 120 is initially restructured at block 122 using common metadata 121 to generate rendition-specific canonical content 123 along with rendition-specific canonical metadata 124. This approach may, for example, involve reformatting the rendition-specific source content 120 into the canonical format prior to restructuring. The rendition-specific canonical content 123 and related metadata 124 is reviewed at block 130 and, if appropriate, corrected. If all renditions are not correct at 132, the process continues using corrected metadata 125 to iteratively restructure the rendition-specific source content 120 at block 126 to generate rendition-specific canonical content 123 and related metadata 124 that is reviewed at block 130 and, if needed, corrected. Once all renditions are correct, the rendition-specific canonical content is published at block 133.

In some embodiments, initial contents data is extracted at block 130', which can be used to generate initial contents representative of the titles of articles in the content. For instance, this approach can be used to provide a teaser preview of contents as the rendition source content is being processed. Such an approach can be used, for example, to provide rapid access to new content and/or to avoid processing delays while getting information out to end users.

Figure 1E:
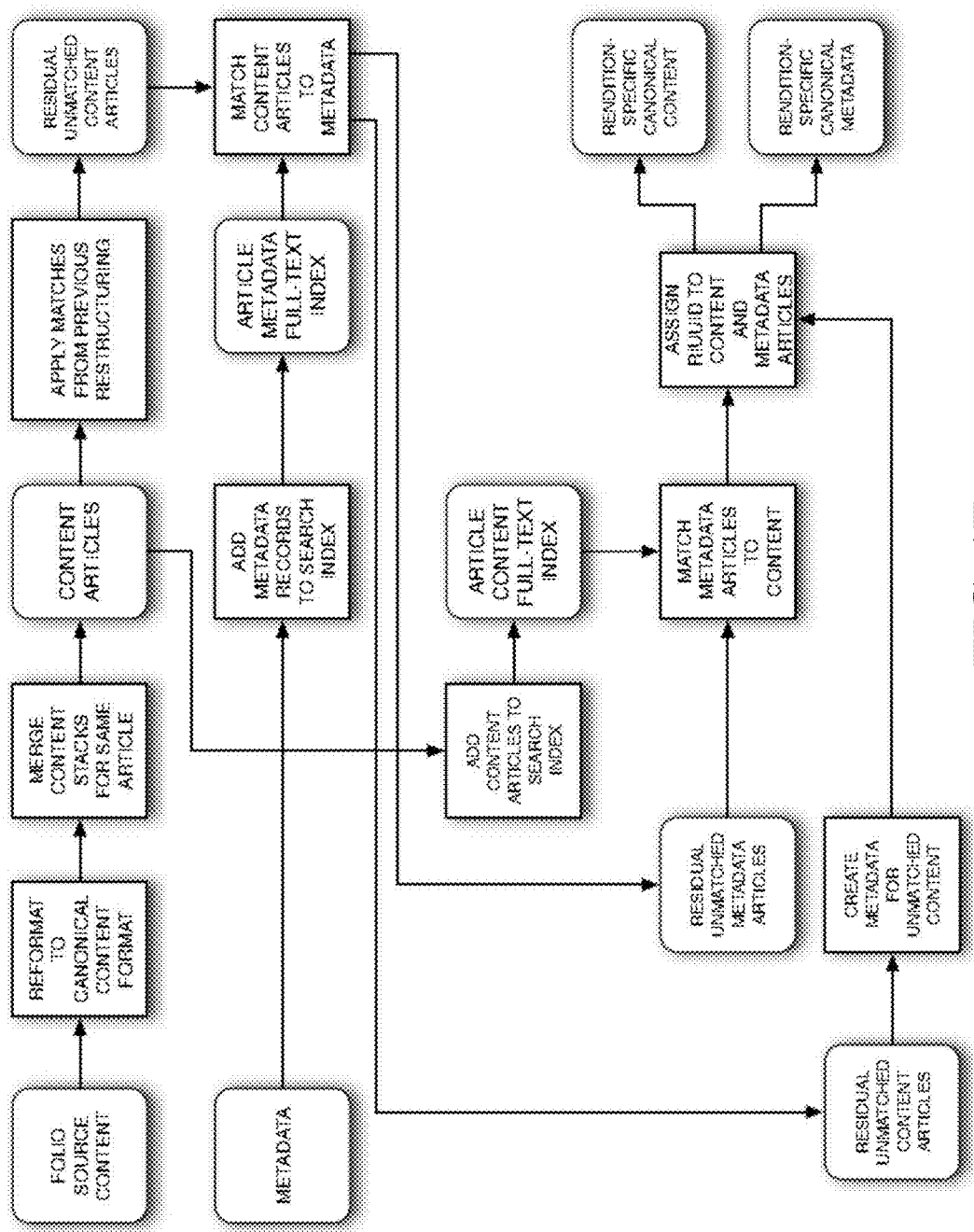
FIG. 1E shows a mid-level overview of an apparatus and/or method, as may be applicable to one or more embodiments.

FIG. 1E shows a mid-level overview of an apparatus and/or method, as may be applicable to one or more embodiments. Source content (such as Adobe Folio source content) is reformatted into a canonical content format, and used to form content articles. Where Adobe Folio content is reformatted, content stacks are merged for common articles. Previous restructuring matches (if any) are applied to match the canonical content to original/source content. Metadata is added to a search index and used to generate a full text index, which is used to match any residual unmatched content articles to original/source content.

The content articles are added to a search index and used to generate an article content full-text index, which is used to match residual unmatched metadata articles to content. Metadata is also created for unmatched content for residual unmatched content articles. An ID (RIUUID) is assigned to the residual unmatched content articles and metadata articles, and used to generate rendition-specific canonical content and related canonical metadata.

Figure 1F:
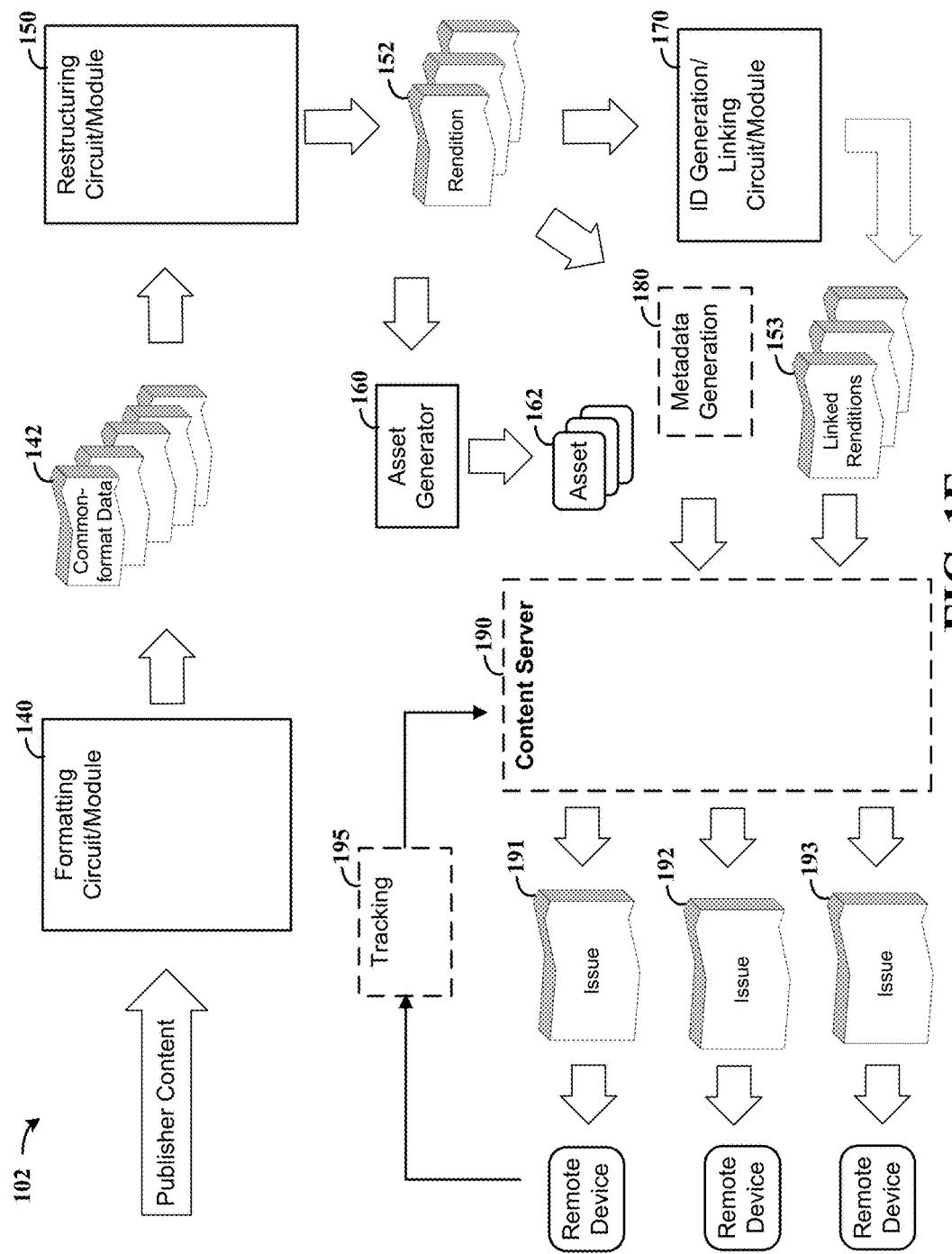
FIG. 1F shows an apparatus/method involving content formatting and restructuring, in accordance with one or more embodiments.

FIG. 1F shows an apparatus/method 102 involving content formatting and restructuring, in accordance with one or more embodiments. A formatting circuit/module 140 formats incoming publisher content, from disparate content providers, into portions of reformatted media content 142 having a common format type such as a canonical format. Publisher content, in this context, may include respective input renditions in disparate formats, which may further include associated metadata packages (e.g., a compressed file). A restructuring circuit/module 150 restructures portions of the reformatted media content 142 into renditions 152 having an article-oriented structure defined by the common format type. An asset generator 160 generates, for each rendition, respective reformatted assets 162 that are specific to one of a plurality of disparate types of devices that may access the rendition, based upon characteristics of the disparate device type. An ID generation/linking circuit/module 170 generates ID data that is associated with the renditions, and links a respective portion or portions of each rendition 153 with portions of the media content data having disparate formats.

In some embodiments, a content server 190 operates to serve content issues (191-193 shown by way of example) having one or more renditions to respective remote devices. Such an approach may, for example, include combining renditions from a common publisher to provide a digital magazine to a user, or combining renditions from disparate publishers to generate a new digital magazine tailored for a specific user (e.g., as a virtual issue noted herein). Such a digital magazine may, for example, exhibit a cover similar to that shown at 194, with modifications therein to show different titles of different electronic magazine issues represented in the digital magazine. In this context, the content server 190 may transmit respective portions of the restructured renditions along with assets corresponding to the respective portion being transmitted, to users at remote devices. In some implementations, such transmissions to each user are based on media content access authorization data for the user, device-indeterminate ID linking data for the rendition(s), and characteristics of the remote device via which the user accesses the media content.

Some embodiments involve a tracking circuit/module 195 that operates to obtain tracking data from remote user devices and/or from other user access sources, directly or indirectly, and provide that data to the content server 190. The content server 190 uses the tracking data in one or more of a variety of manners, such as for combining renditions into issues, arranging assets, or providing different advertising in copies of the same issue provided to different users based on the tracking data as relative to each user. In a more particular embodiment, the tracking circuit/module 195 tracks access to the restructured renditions, such as renditions pertaining to articles. The content server 190 identifies new renditions from different ones of the respective issues for individual users, based on the tracking, media content authorization data for the user and characteristics of a remote device that the user employs to access the issues. The content server 190 further combines the identified renditions into a combined data set providing a digital magazine, and presents the digital magazine to the user. In some embodiments, metadata is generated for each rendition at 180, and associated with each rendition. This metadata may, for example, include linking data generated at 170, include data linking some or all of each rendition with an article or articles, or with media content issues (e.g., digital magazine issues). This approach may be used, for example, to assign new metadata to articles or pages within articles, such as may be used to organize content within the articles relative to pages and/or assets on the pages.

Figure 1G:
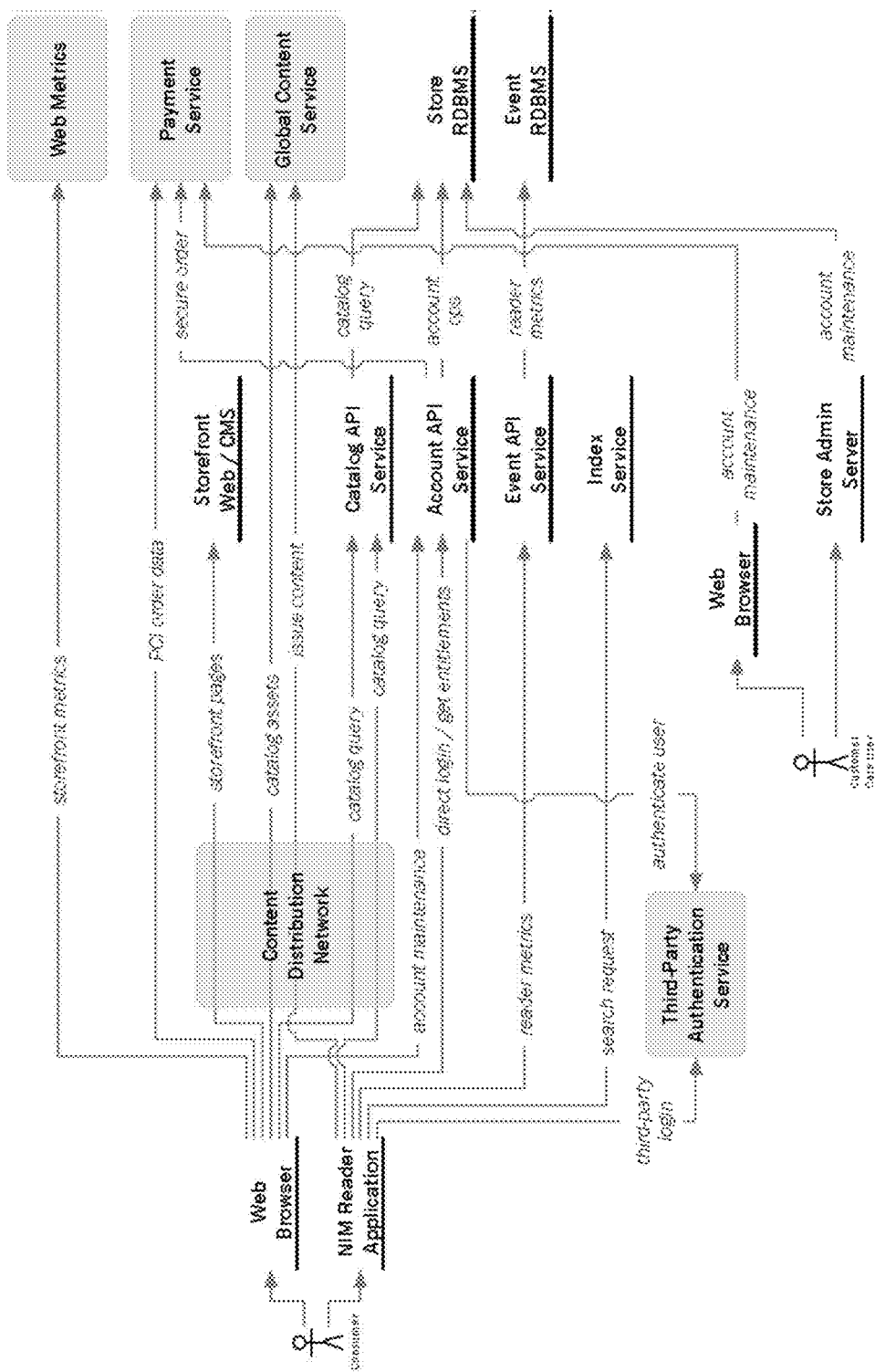
FIG. 1G shows a high-level overview of an apparatus and/or method, as may be applicable to systems relating to content consumption, in accordance with one or more example embodiments.

FIG. 1G shows a high-level overview of an apparatus and/or method, as may be applicable to systems relating to content consumption, in accordance with one or more example embodiments. A storefront Web/CMS interacts with users, with specific content that may be tailored as described herein. Further, the storefront Web/CMS can also be tailored to operate in accordance with a particular network or location (e.g., tailored to a particular entity offering internet access, and/or to a location at which the service is offered). A content management system can be implemented in this regard, for providing content access based on one or more of the user accessing the content, the content provider, or a provider of services that are used to deliver the content to the user. Respective application programming interfaces (APIs) can be used to provide cataloging, account services, event services and index services as shown. Resulting information can be stored (e.g., in a relational database management system—RDBMS).

Figure 1H:
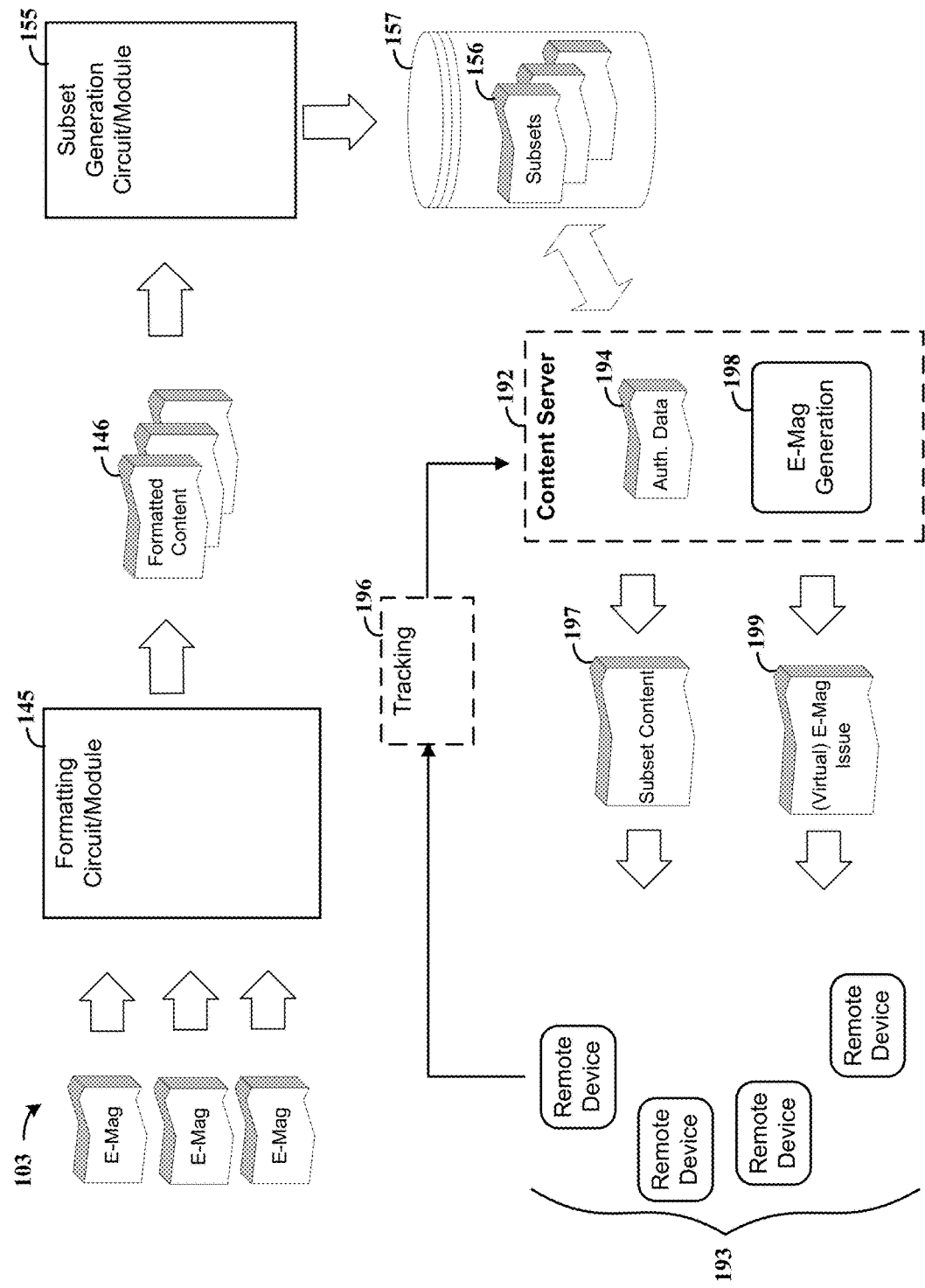
FIG. 1H shows a method/apparatus involving the generation of a specific electronic magazine based on user interests, as may be implemented in accordance with one or more example embodiments.

FIG. 1H shows a method/apparatus 103 involving the generation of a specific electronic magazine based on user interests, as may be implemented in accordance with one or more example embodiments. A formatting circuit/module 145 accesses respective sets of media content data associated with disparate electronic magazines (E-Mags) provided by disparate publishers, and formats the accessed sets into a common computer data format type 146. Each of the formatted sets of media content data 146 is broken by subset generation circuit/module 155 into subsets 156 that are stored at 157. A content server 192 provides remote access to subset content 197 including one or more of the respective subsets of media content data 156, for users at respective remote interface circuits 193. In some instances this access is provided based on authorization data 194 specifying one or more electronic magazines that each user is authorized to access.

A tracking circuit/module 196 tracks access to the subset content 197 provided to the users, and provides data characterizing the tracked access for use by the content server 192. An electronic magazine generation circuit/module 198 operates to combine disparate ones of the subsets 156 to generate (virtual) electronic magazine issues 199 tailored to specific users. These generated electronic magazine issues may, for example, be generated by combining disparate ones of the subsets of media content data based on both the tracked access and authorization data 194 for the user. For instance, authorization data 194 may specify one or more electronic magazines that each user is authorized to access, such that subsets of different portions of magazines to which the user has access can be combined into such a virtual magazine issue including content from disparate publishers. This combination can further be effected using disparately-formatted data received from the publishers. Moreover, the combination and resulting electronic magazine layout can be effected using specified display characteristics relating to disparate publishers and disparate remote devices (via their capabilities), facilitating enhanced access and display capabilities.

In the various figures herein, circuits and/or modules may be combined, or separated into distinct circuits and/or modules. In this context, various embodiments involve one or more computer circuits that encompass(es) two or more circuits or modules as characterized herein, providing the relevant functionality that enhances operation of the computer circuits and related interaction with remote circuits, such as those employed within user interface devices. These approaches may be useful, for example, for configuring an interactive display of content (such as combined content from disparately-formatted sources) for use by individual users at disparate devices which would otherwise be incapable of displaying the content in respective formats or combined. This enhances operability of both content service provided via respective servers and end-user devices, as well as interaction therebetween.

Figure 2:
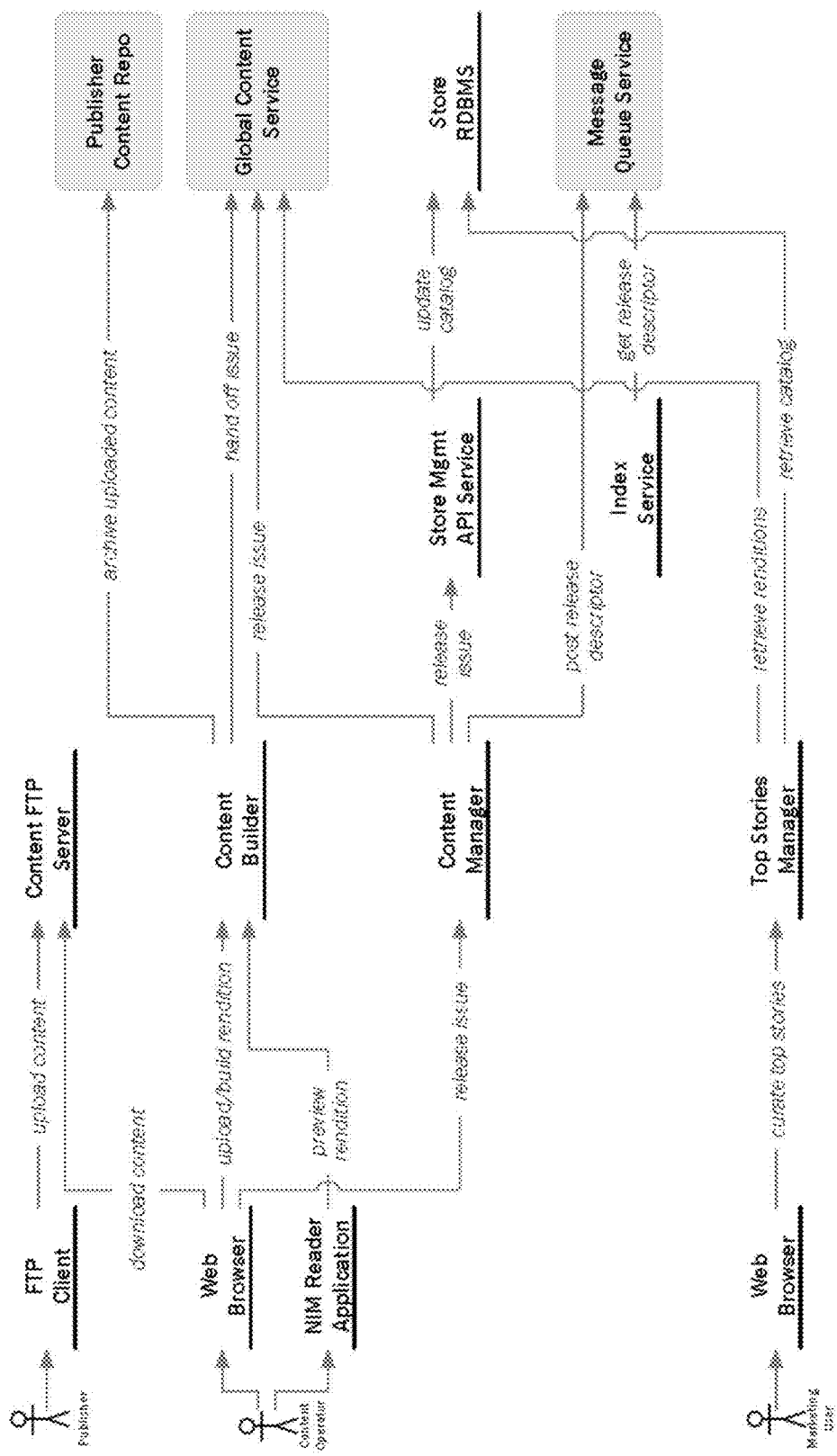
FIG. 2 shows an overview of systems relating to content production, in accordance with one or more embodiments.

FIG. 2 shows an overview of systems relating to content production, in accordance with one or more embodiments. A content builder module interacts with a content manager module via a global content service. The content builder module transforms content into a format as characterized herein, and delivers the content into a staging area from which the content can be accessed (released), as controlled by the content manager module. These modules may be integrated together.

Figure 3:
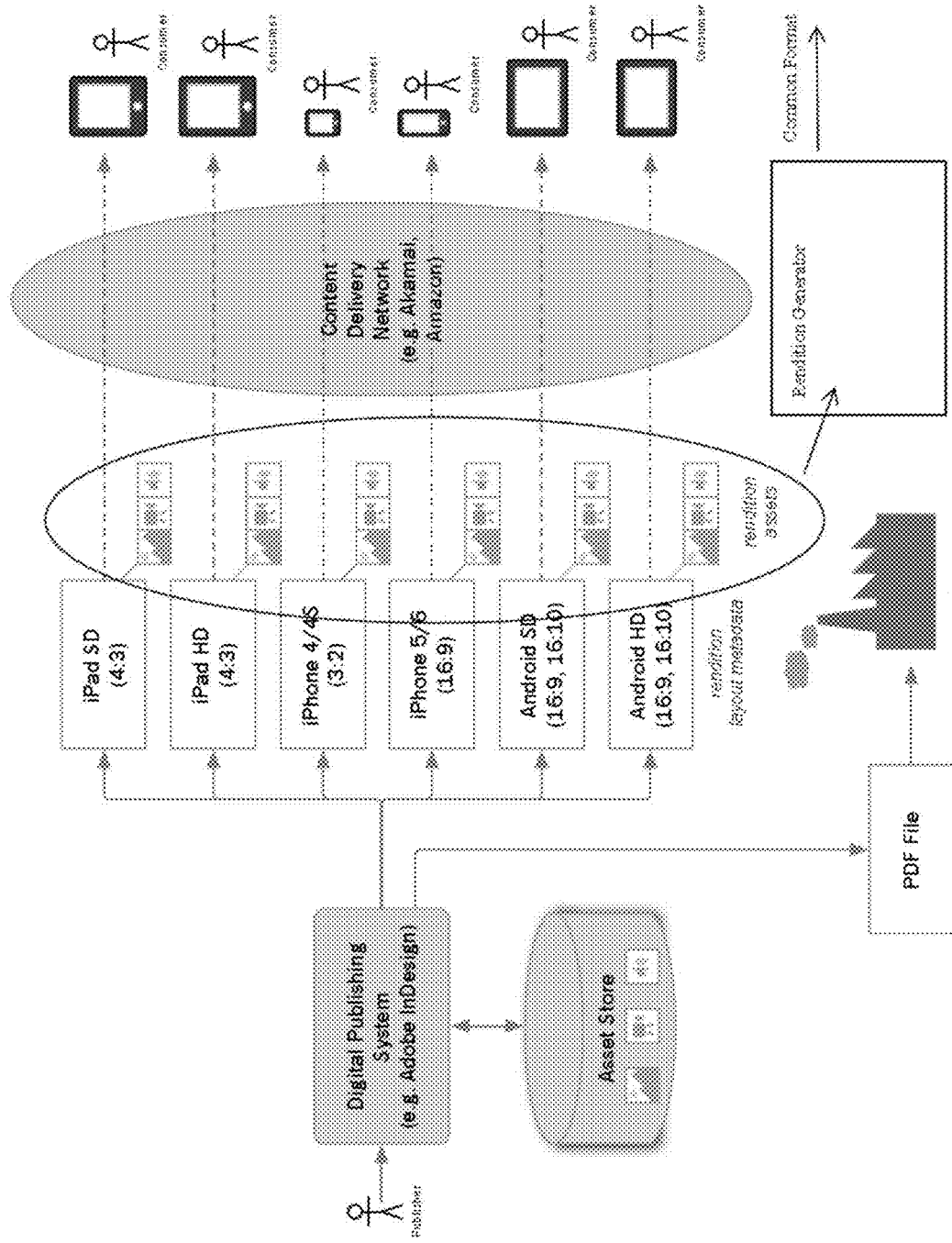
FIG. 3 shows a publishing apparatus and approach involving the generation of one or more renditions in a common format, that provides consolidated access to content otherwise provided in a disparate fashion, in accordance with one or more embodiments.
Figure 4:
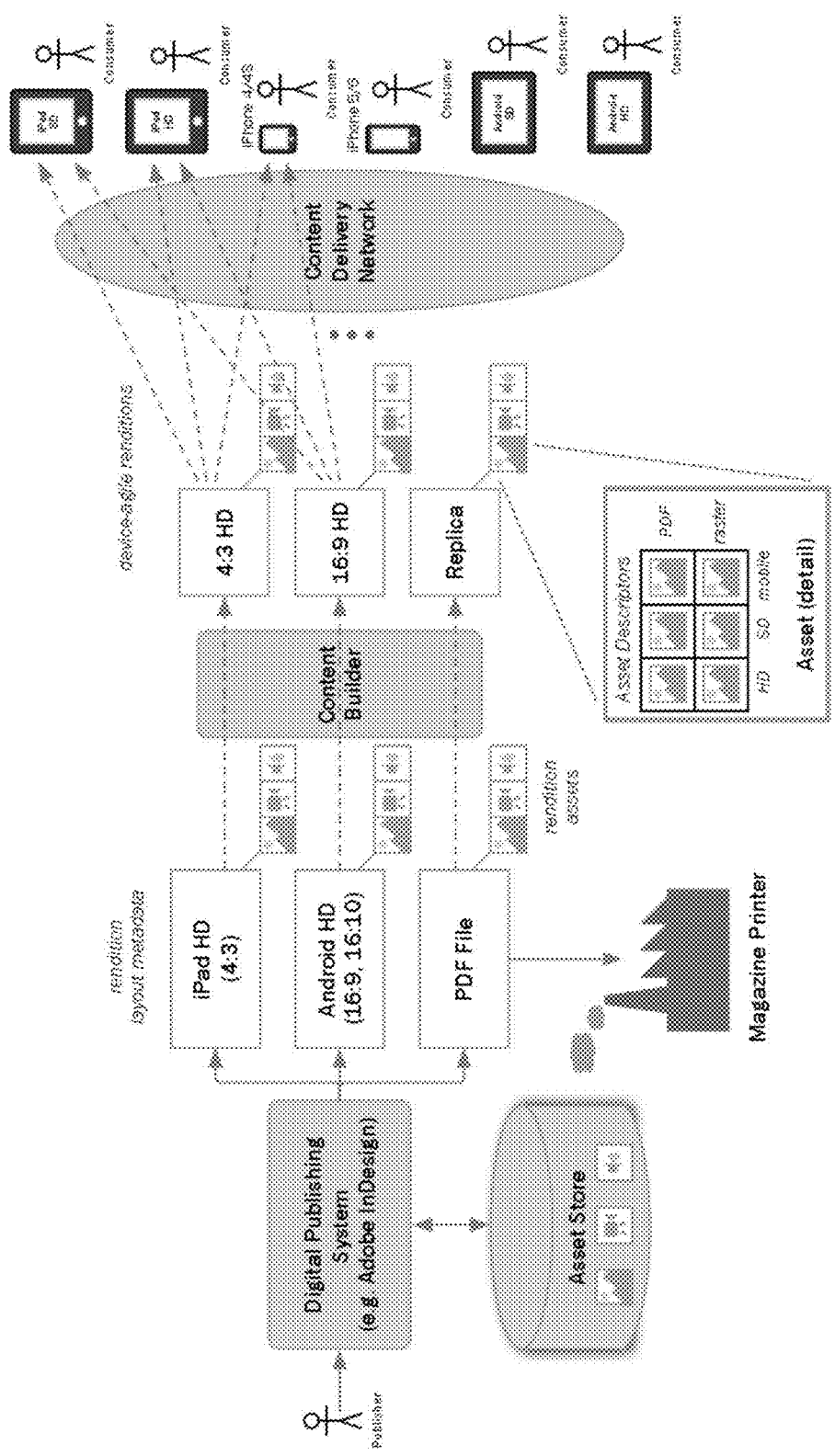
FIG. 4 shows an apparatus and approach with a single rendition having multiple physical assets for each logical asset, providing access to common content via different physical assets amenable to different device characteristics, in accordance with one or more embodiments.
Figure 5:
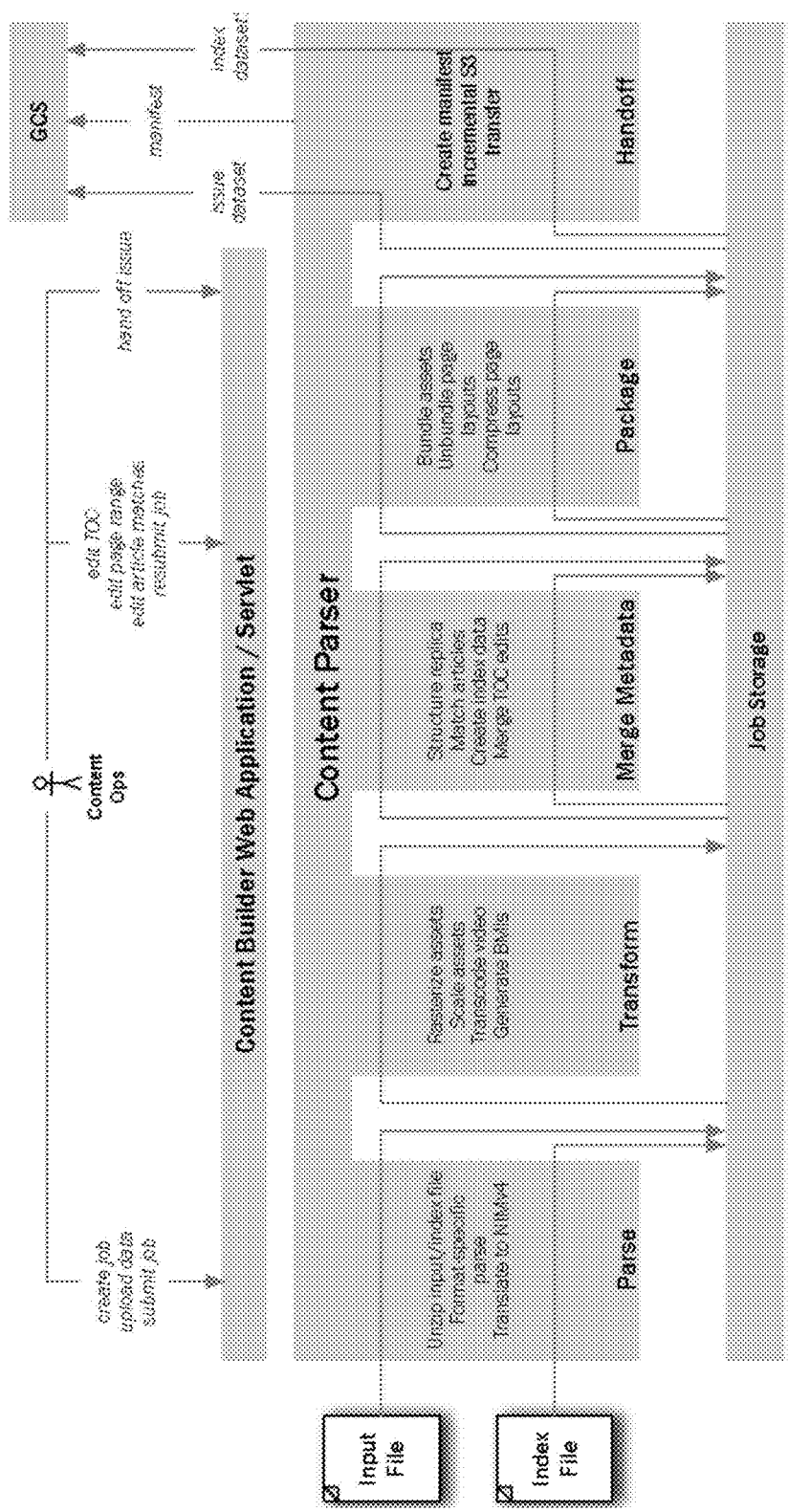
FIG. 5 shows an apparatus and approach with content building, in accordance with one or more embodiments.
Figure 6:
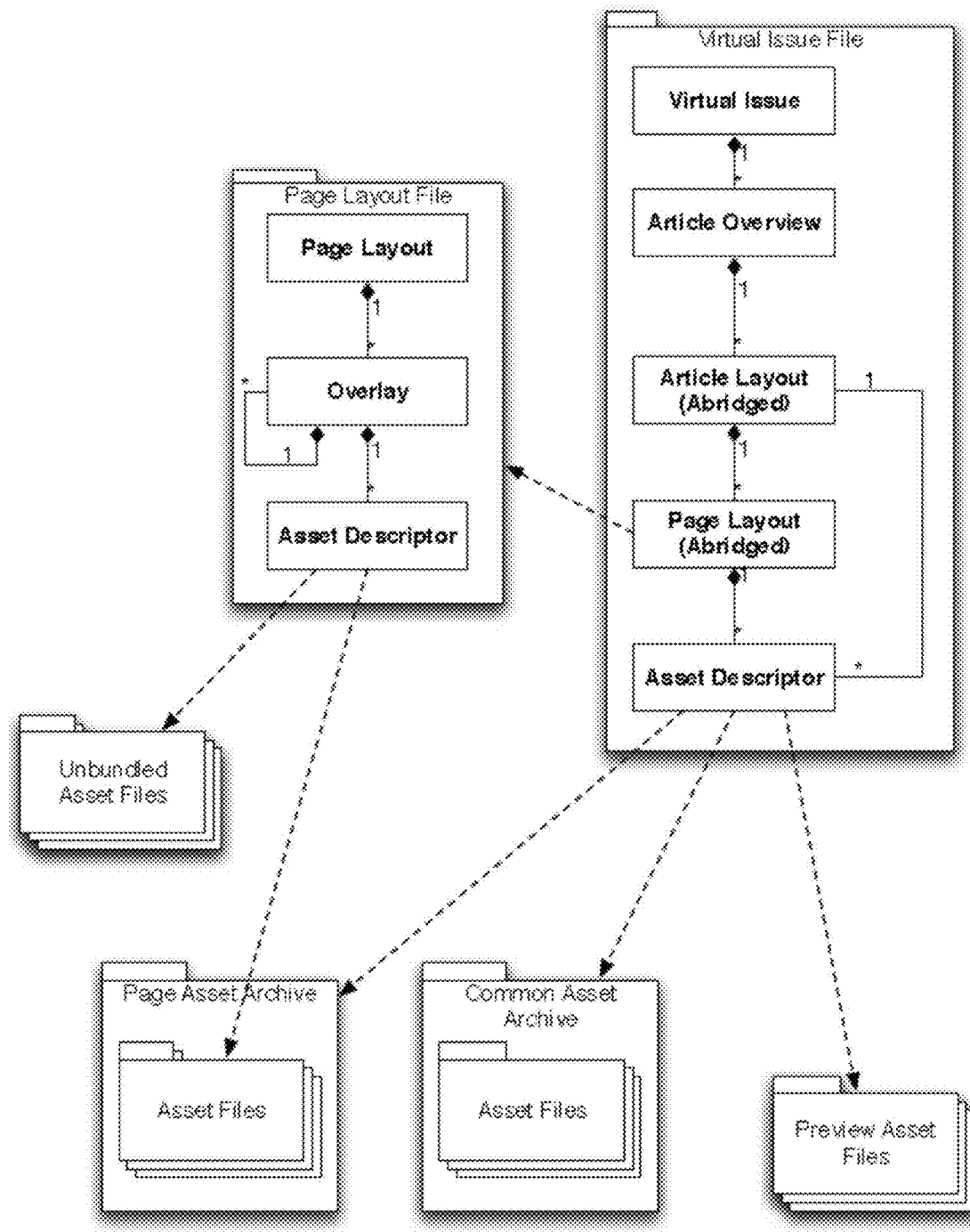
FIG. 6 shows a data storage/access apparatus and approach, in accordance with one or more embodiments.

FIG. 3 shows a publishing apparatus and approach involving the generation of one or more renditions in a common format, which provides consolidated access to content otherwise provided in a disparate fashion, in accordance with one or more embodiments. FIG. 4 shows an apparatus and approach with a single rendition having multiple physical assets for each logical asset, providing access to common content via different physical assets amenable to different device characteristics, in accordance with one or more embodiments. FIG. 5 shows an apparatus and approach with content building in accordance with one or more embodiments. FIG. 6 shows a data storage/access apparatus and approach in accordance with one or more other embodiments. In various embodiments, incoming data is originally parsed and preserved for various uses and distribution to subscribers in accordance with various aspects characterized herein, such as with the formatting and restructuring approaches described above.

In some implementations, different content sources for a particular set of media content and related assets are combined and formatted to a common format as discussed herein. Common index formats are generated and linked relative to metadata, and different source renditions are correlated. For instance, publisher content (e.g., a rendition) for a particular magazine issue that is formatted for a specific user device can be taken in, reformatted into a general high-definition format, and scaled and formatted to provide assets that are accessible by a multitude of disparate types of devices.

In various embodiments, media content is reformatted to account for differences in device and display characteristics, such as aspect ratio and/or differences in display resolution. In some implementations, media content assets are formatted into separate physical assets for a particular logical asset to maintain certain compatibility, such as that relating to aspect ratio. For instance, separate sets of assets can be made for devices with different aspects ratios or different display sizes. Content can be scaled, such as for display on a large display class (e.g., tablets) or small display class (e.g., hand-held mobile telephones). In certain applications, changes in content may include reflowing text and providing different page layouts.

Various other embodiments tie in data on each rendition to a particular portion of source content, such as articles, sections or other structural components. Content assets and interactive elements may include, for example, images, audio, video, buttons, hyperlinks and pop-ups. For instance, data such as that relating to how users access various magazines, how much time they are spending on certain articles, and which advertisements are viewed can be traced back to source content via mapped content ID. As such, a rendition-dependent article ID can be used in recording data regarding the access to content in the specific rendition, along with a rendition-independent ID that maps the rendition back to an original set of media content to provide access information about supported device types. Such an approach may involve, for example, extracting and correlating metadata and other assets, and/or using correlation between respective renditions to track and match access data (e.g., by matching to a table of contents-type correlation of data). In this context, a rendition-independent ID may be mapped to several rendition-specific IDs. A similar approach can be used for tracking access to specific (logical) assets.

Data can be tied in or linked in a variety of manners. In some implementations, an interactive approach for tying or linking data employs both manual matching and automated matching. An initial automated match is carried out using a computer-type circuit to match portions of content from an input file to a new format or rendition, which can be carried out when the input file is transformed. A user can then review the result and correct errors. The new format/rendition is rebuilt using such user-corrected matching directives. In various such approaches involving the transformation of and related matching with publisher-provided input data, publisher-supplied metadata is used as a basis for matching articles across renditions. Publisher metadata is also used to provide article and section structure to renditions that do not naturally have structure, such as a PDF input supplied by publisher. The publisher metadata provides a common reference point between different renditions, and the same metadata can be used for all renditions of an issue. In various embodiments, publisher metadata associated with an input article or rendition is used to generate other renditions in different formats.

For certain types of documents such as PDF documents, publisher metadata describing organization of the PDF can be implemented in this regard to generate a table of contents. This can be particularly helpful where such documents are not provided with a table of contents or similar structure. For instance, certain types of documents, such as PDF documents, do not contain information that identifies article structure. For such documents, publisher metadata describing article organization can be implemented in this regard to generate the article-page containment hierarchy and a table of contents. This information can be linked to assets that provide content for each page, such as text, images and/or video.

Using approaches as described herein, usage data for a particular set of media content can be tracked across multiple devices and renditions. For instance, a person browsing a page or otherwise accessing an asset and spending 10 minutes doing so on a first type of tablet and another person spending 15 minutes on the same page or asset in a different format another type of tablet are matched. Such an approach may involve table of content-based matching, other hierarchical matching, and or aspects that relate rendition-specific IDs to rendition-independent IDs. Certain embodiments involve matching content from different formats using two or more statistical-type approaches.

Accordingly, content from various sources including magazines and others can be linked together and provided via a common format. Content can thus be automatically created, with information in the resulting combination displayed and accessed with related tracking across multiple scaling and format types. Non-homogeneous content from different sources can thus be linked and tracked commonly. For instance, web content or advertisements can be dynamically encapsulated into a common format, and may be mixed with other content such as publisher-based magazine content. In these contexts, dynamic content can be built out from existing ad assets or websites.

In more specific embodiments, content provided in a general format is reformatted and imparted with navigational and/or page layout metadata data. Such data may include, for example, page layout for the display of text and/or images, and navigational information for these items. The reformatted data (including any relevant assets) is configured and implemented for a device having a display type and/or processing system different than another device for which the layout/navigational data was generated, by converting the layout/navigational data for use with the device for which the reformatted data is configured. The converted data is used to generate structural views for the content on the device for which the reformatted data is configured, which is consistent with structural views of the content on the device for which the layout/navigational data was generated.

For instance, content that is provided in a portable document format (PDF) and having a corresponding initial format for a specific type of device (e.g., for a specific brand of tablet) can be processed to generate content in format that is different than that of the specific type of device but having a layout and navigational information that generally matches that of the initial format. Such PDF content may not have article structure or other metadata associated with it, in which case layout and navigation data is generated to provide a structure that matches that of the initial format, or that does so with scaling applied (e.g., for differently-sized displays). The generated data may thus impart article structure as well as other aspects such as navigational aspects relating to other content.

Accordingly, various embodiments are directed to generating a common content format with a layout and navigation, for multiple different types of received content including content having a format for a specific device, content having article structure without navigation, and content generally format-free such as content in a PDF. The common content format can then be used to generate content for a multitude of different types of devices, which can be implemented to track metadata for the content. Accordingly, a common view and/or navigational structure are provided for access via disparate types of devices. These approaches facilitate user navigation as well as tracking for intermittent access to content and for identifying content access by multiple users. For instance, media content in the form of magazine articles may have different numbers of pages, different layouts, and different renditions. Access to portions of the articles (e.g., pages, or assets) via different types of devices is tracked similarly, to provide an indication of the content accessed independently of the page on which the content is provided or the location on the particular page being viewed.

In some embodiments, magazine data is formatted from original/input data having sections, a collection of articles in each section, and a collection of pages in each article. An index file is created to characterize the magazine, such as to indicate where each article starts in the data. Text can be obtained for each article or page of an incoming article, and broken into subsets of text (e.g., a certain number of words), and the words are processed with a search engine to correlate the text subset with a particular article or page of the incoming article. For instance, certain subsets may span more than one article or page, and a particular page may include text from two or more subsets.

In some implementations, the subsets of text are selected in a manner that facilitates correlation to articles, pages or other components of original documents. For instance, if text is extracted from an original document having a four-page article, subsets of text in the article may be correlated to four different pages in a resulting reformatted media file. In some implementations, page ranges for an article are identified using a search engine approach to match pages of an incoming article to a page range in reformatted media content. As may be consistent with auto-correlating, the page ranges are compared relatively (e.g., as two linear arrays or linear matrixes that can be slid over one other). Once the page ranges are matched (e.g., via a highest page correlation relative to position), the incoming and reformatted content are anchored against each other, and data can be filled in the reformatted version or otherwise adjusted to accommodate mismatches. Further, navigational information can be generated using such matching aspects.

Rendition-independent tracking data is provided and used in a variety of manners to track articles as accessed in various different renditions. In various implementations, data-matching is carried out to identify common content presented in different renditions. One such approach involves the use of a search engine type function as discussed above for text. Other approaches involve the matching of image data. In various contexts, an index of content is created in one domain, and matched to content in another domain using search expressions to find the best match. This information can be used to correlate portions of media content, such as articles. The portions of media content are correlated to a general identification, such as to an index file, that can be used to identify content independently of the end-use format/rendition of that content and the device on which the content is accessed. Such approaches may, for example, be implemented in matching data for media content that has been converted to a common format, back to an original media content file from which the data in the common format has been generated.

These approaches may also be implemented to match different formats of a common set of data within a rendition or in respective renditions of the media content generated from the media content in the common format. Device-independent identification data can thus be assigned to the content in accordance with the common format, with the match (or other linking data) used to correlate content in the renditions back to the media content in the common format. In some implementations, assets may be linked back to content in such an original media content file, generally or specifically. This device-independent data may, for example, link magazine content back to an original magazine article. In various implementations, original media content files used in this context are modified to facilitate searching and matching.

In various embodiments, interactive functions provided in an original media content file are linked to a converted version of the media content file in a common content format. These interactive functions are correlated with related text or imagery as in the original media content file. Similarly, attributes of media content variations, such as high-resolution and low-resolution options as well as high-bandwidth or low-bandwidth (e.g., with lower resolution and/or fewer data-rich components), can be linked back to the original media content. This may, for example, involve linking different physical assets back to a single logical asset. Similarly, different versions of executable code or other interactive components such as web links, video and audio as implemented on disparate end-user devices can be linked to one another.

Figure 7:
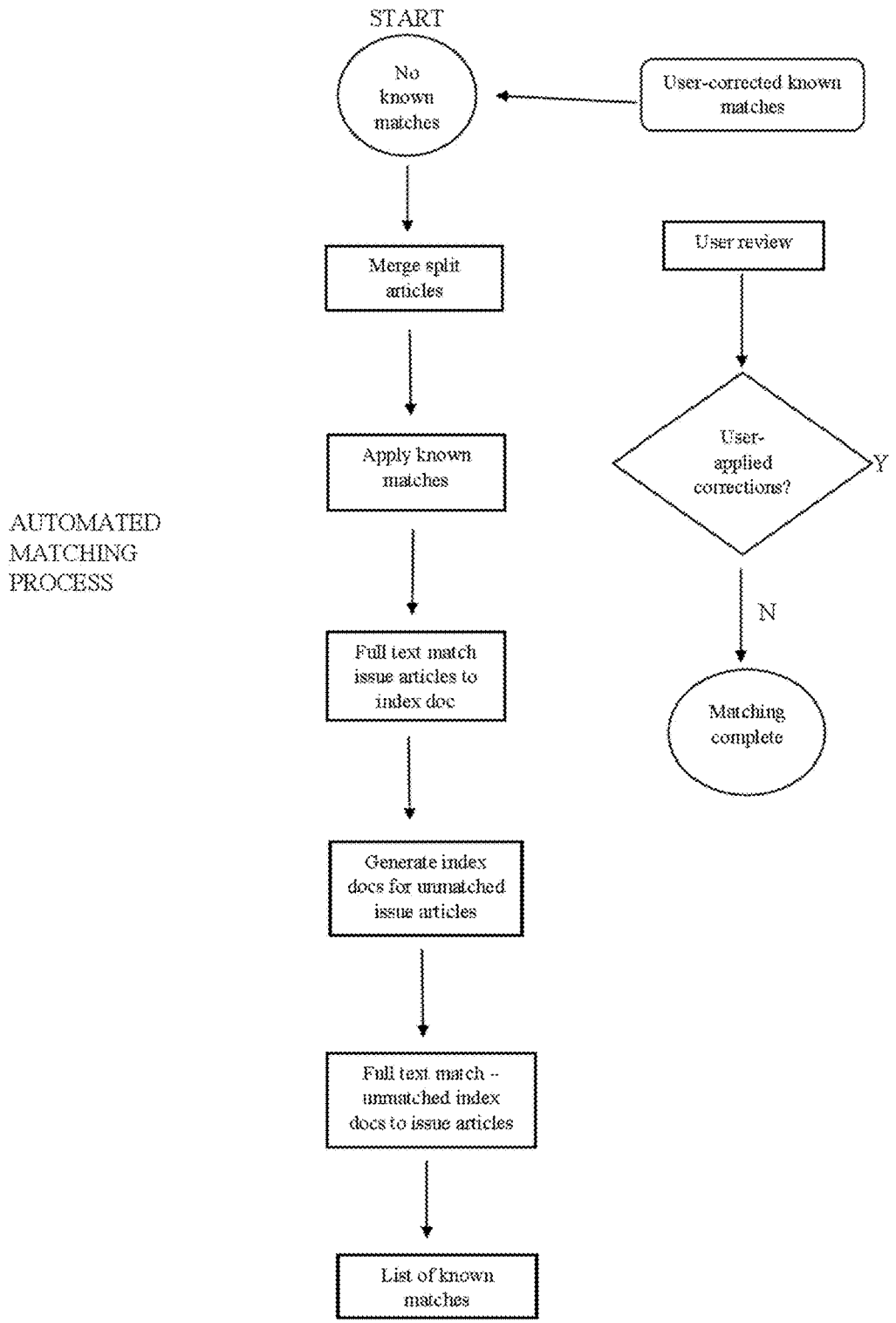
FIG. 7 shows an approach involving the creation of interactive renditions, in accordance with another example embodiment.

In some embodiments, interactive renditions are created using an article matching approach, using an approach such as shown in FIG. 7. Each article is matched to a particular publisher, with metadata used such that each article has a rendition independent ID.

In various embodiments, linking of text is carried out for articles provided with publisher metadata that includes a collection of index documents, with one index document for each magazine article. Such index documents may, for example, involve publishing requirements for industry standard metadata (PRISM) format XML files. In certain approaches, rendition-independent ID can be computed using a hash function on input data including globally-identifying code for a magazine title, the cover date of the magazine issue and an identifier for the article that is unique within the magazine issue.

Figure 8:
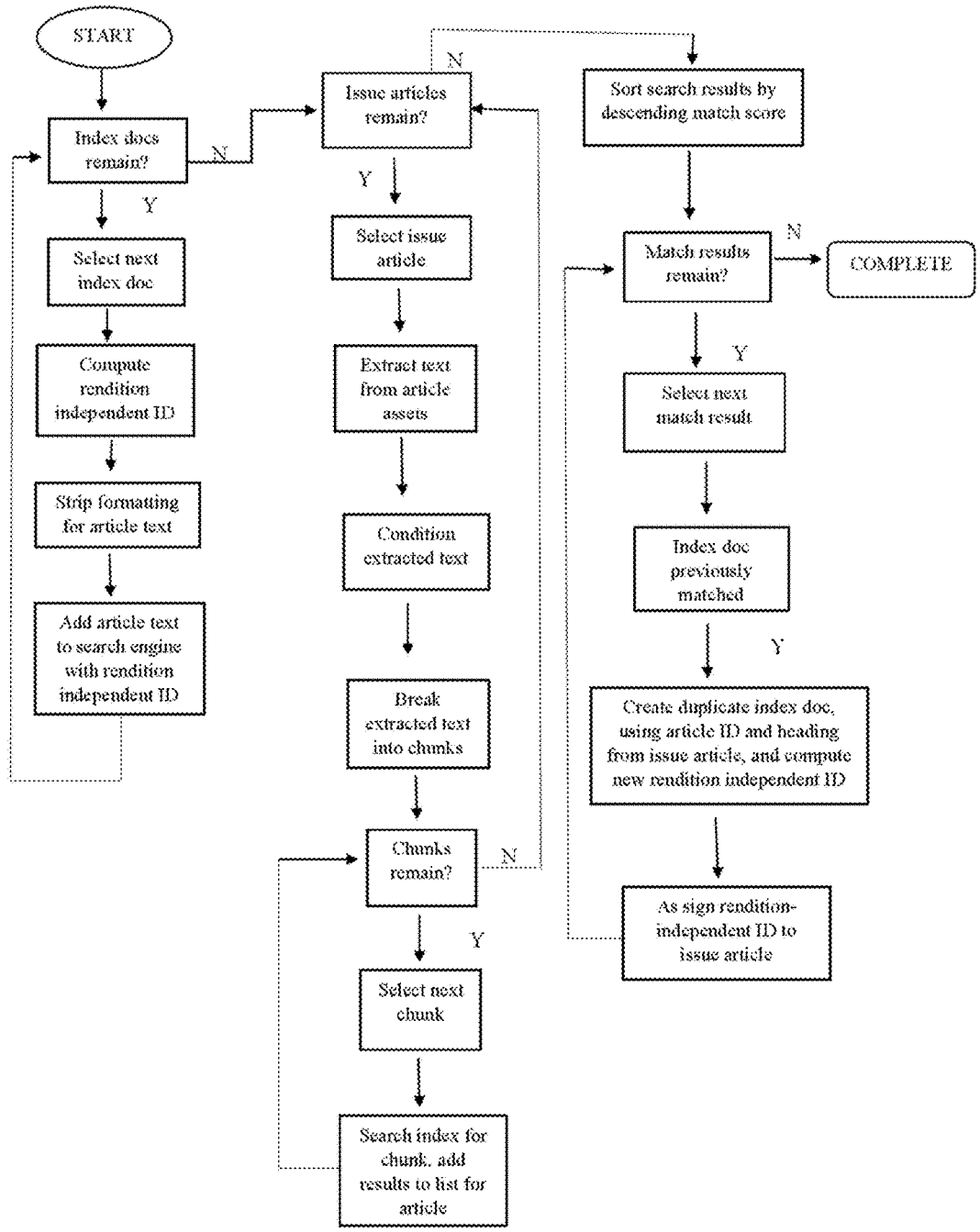
FIG. 8 shows a full-text matching procedure as may be carried out with the approach shown in FIG. 7, in accordance with another example embodiment.

FIG. 8 shows a full-text matching procedure. Such an approach may be carried out as part or all of the "issue article to index docs" step of the approach shown in FIG. 7. Where unmatched index documents are linked to issue articles, data is stored in the search index and data is chunked and used in searches.

Figure 9:
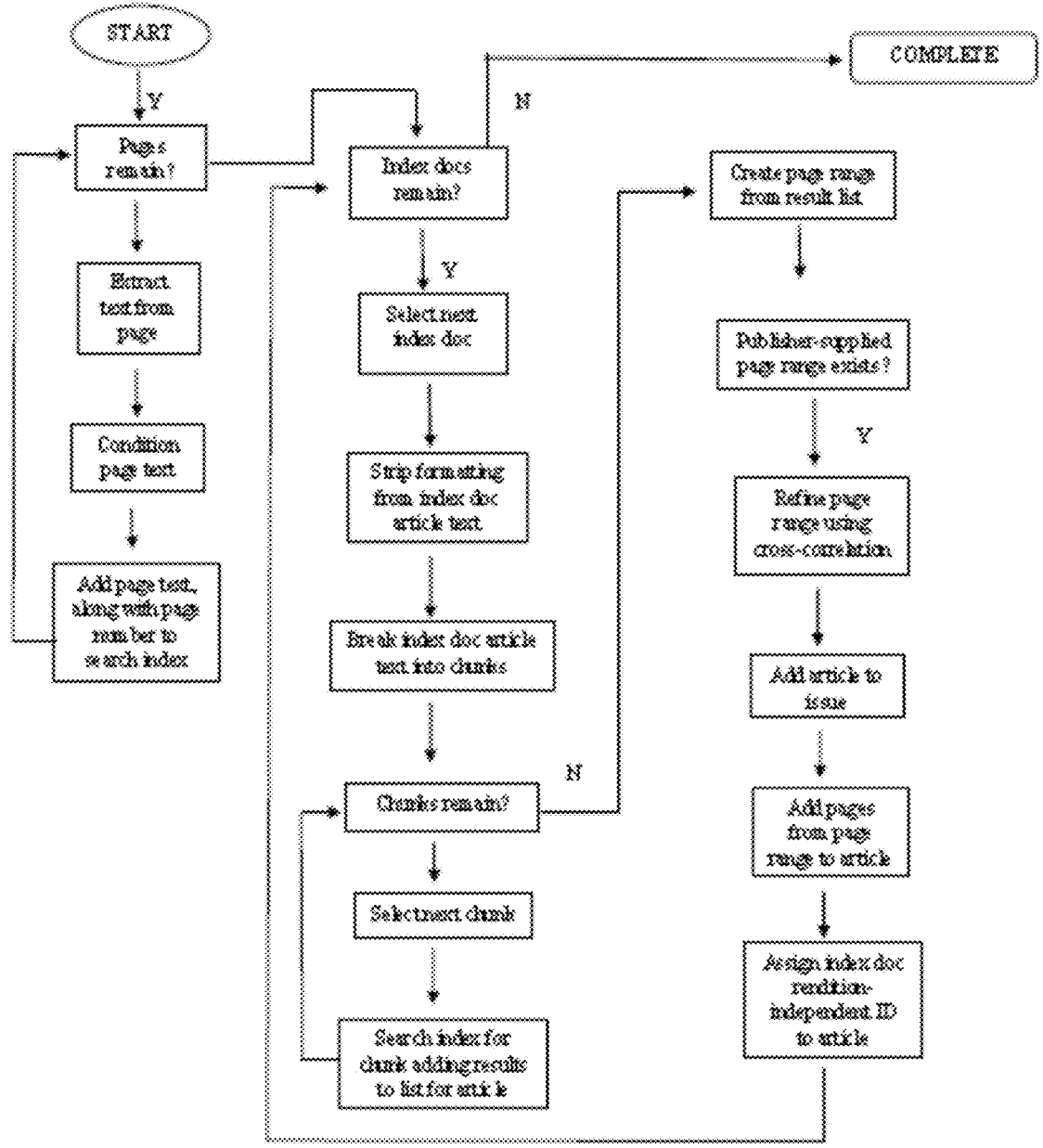
FIG. 9 shows an approach involving matching with replica renditions with no article structure, in accordance with another example embodiment.

In certain embodiments involving replica renditions such as PDF-based renditions that have no article structure, page matching is carried out as shown in FIG. 9. The article structure is generated using publisher metadata so that table-of-contents navigation can be performed in the reader, and so that articles are correlated by a rendition-independent ID against counterpart articles in other renditions.

Figure 10A:
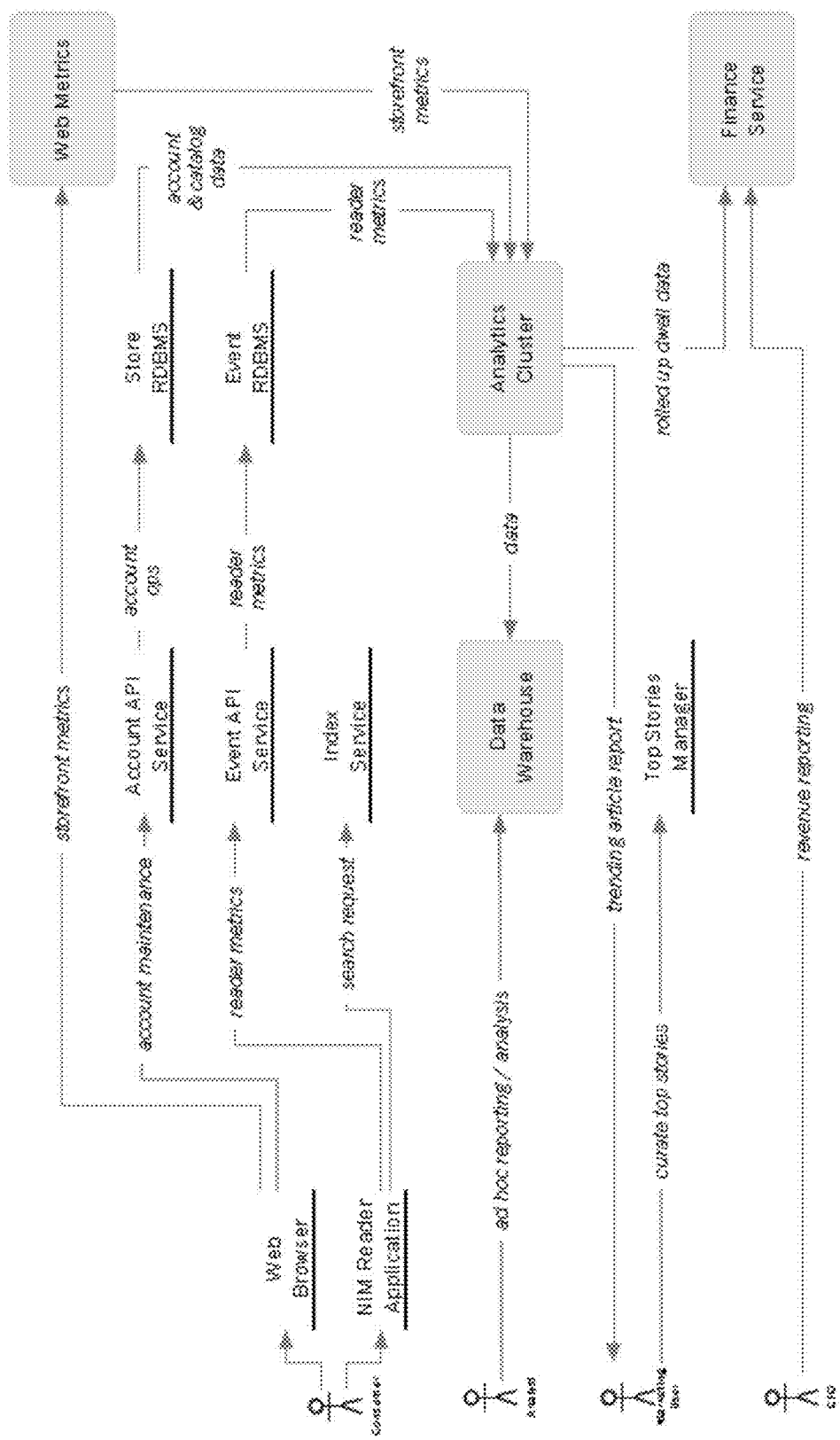
FIG. 10A shows a system as may be implemented for data management, in accordance with another example embodiment.

FIG. 10A shows a method and apparatus for managing data. Reader metrics, storefront metrics and account & catalog data are loaded into an analytics cluster, which processes the data to provide characterizations of the inputs. For instance, metadata can be used to track usage of content, which is in turn used to identify top stories or other components that can be used across multiple users.

Figure 10B:
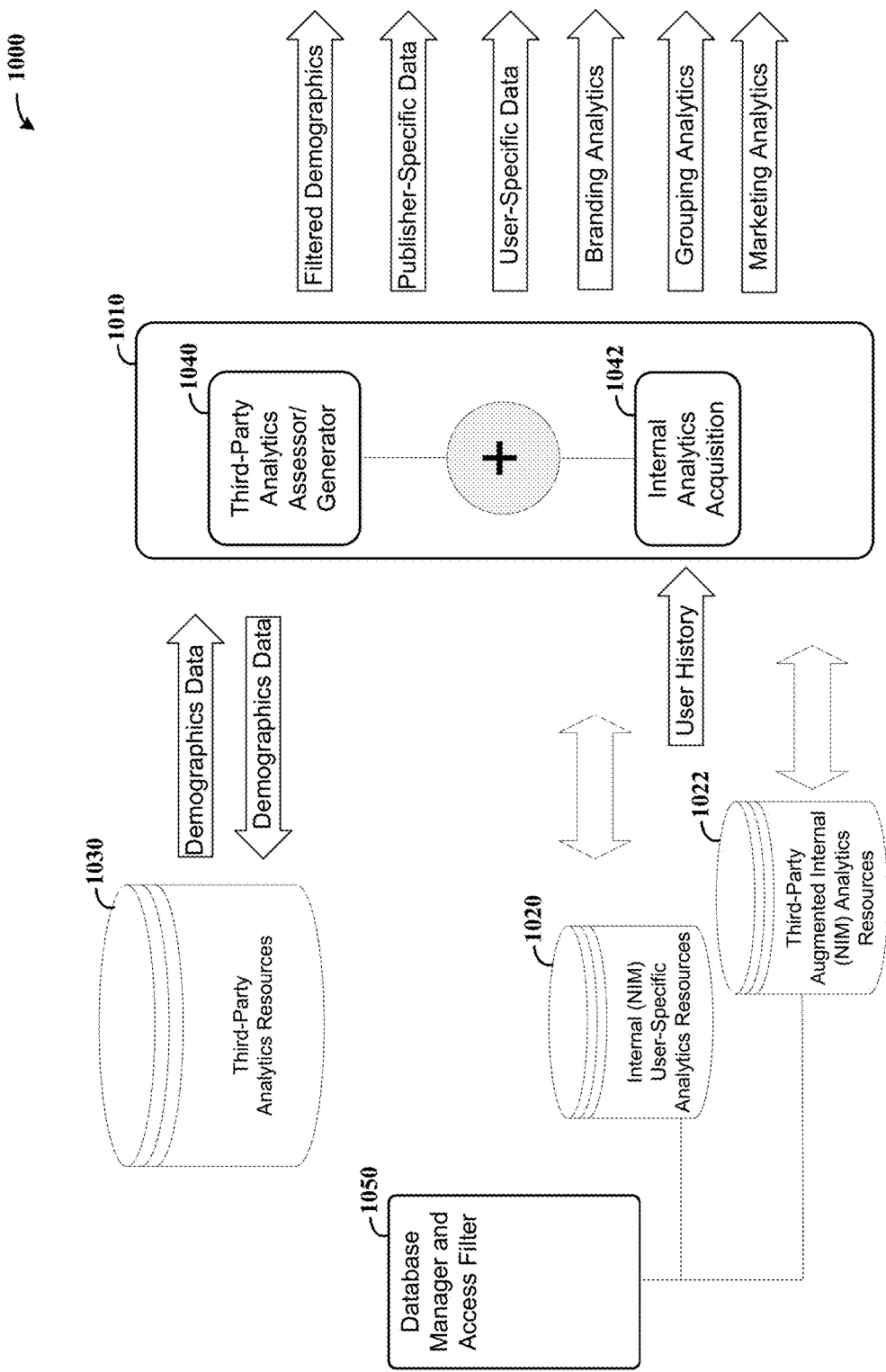
FIG. 10B shows a system with analytics-based aspects, in accordance with one or more embodiments.

FIG. 10B shows an analytics-based apparatus 1000, as may be implemented with the analytics cluster in FIG. 10A and/or as a separate embodiment. The apparatus 1000 includes an analytics module/engine 1010 that utilizes analytics data, to provide information that can be used in a variety of manners, including for restructuring media content. For instance, the restructuring instructions may be provided at block 122 in FIG. 1D, restructuring circuit/module 150 in FIG. 1F, or electronic magazine generator 198 in FIG. 1H. These aspects can be provided within a Next Issue Media electronic magazine system. The analytics data may be accessed by using one or more of: internal analytics resources 1020 (e.g., obtained via tracking at 195 in FIG. 1F); external/third party analytics resources 1030 (e.g., based on user demographics provided from third-party sources); and the generation of analytics data at analytics assessor/generator 1040 or assessor/generator 1042. A database manager/access filter 1050 operates to control access to the respective resources.

The analytics data may be generated, for example, in conjunction with the tracking noted in FIG. 1F and characterized herein, such as by generating analytics pertaining to user access to renditions. This analytics data can be generated for disparate users, or for users grouped together (e.g., based on commonalities). Further, the analytics data can be generated as hybrid data, utilizing demographics data provided by third-party analytics resources at 1030 together with user-specific (private) internal resources at 1020 and/or as generated. Augmented internal analytics resources can be generated at 1042 and stored at 1022, used internally and/or provided to external entities via access that is filtered by the database manager/access filter 1050. For instance, filtered demographics can be provided to indicate an enhanced demographic information, based upon tracking internally to the NIM system. Publisher-specific data can be provided to publishers for analytics information pertaining to that publisher's material. User-specific data can be provided to each user or to a group of users (e.g., to an entity/employer for generating employee-based analytics). Branding analytics data can be generated for indicating successful/desirable branding approaches. Marketing analytics can be provided to provide an indication of success of certain marketing approaches. In various implementations, these types of data can be generated using private analytics internal to the NIM system (e.g., to analytics module/engine 1010), while maintaining confidentiality of the private analytics themselves.

The following discussion exemplifies how the overview diagram of the analytics-based apparatus 1000 of FIG. 10B might be used. Assuming two primary databases of relevant user demographics (1020 and 1030), analytics data is collected from external (third-party) resources and also collected from the system's ongoing tracking of subscriber accesses to magazine-directed products generated by the system (e.g., at the output of analytics module/engine 1010). The system's ongoing tracking of subscriber accesses are much more user-specific as the system uses cookies and other memory tools to track which articles, article types and advertisements the subscribers have reviewed, read and/or hyperlinked to for further information. The analytics data collected from external (third-party) resources is less specific to the user as it includes higher-level information such as tendencies of users having relevant/common age, geographic device location, purchases tendencies (e.g., more elite/expensive products, sales) and areas of interest (e.g., type of sport, fiction reading, politics). Within analytics module/engine 1010, the system is configured to employ as a starting point, the more user-specific data and then probe an expanded range of the user's access tendencies by exploring and then tracking whether user accesses (and to what extent) new products aspects. For instance, if the user was tracked by his/her accesses of articles on democratic-party politics, the system might market (to the same user) articles on politics which feature more neutral/independent positions and track how the user reads/treats such featured articles. Such efforts by the system to further explore and then track the user stems from: (i) the system's ongoing tracking of subscriber accesses to magazine-directed products; and (ii) likelihood assessments that data from that internal gathering effort is common with the above-mentioned third party demographics data. This combined information is depicted with the additive symbol "+" in block 1010 of FIG. 10B. Further, by weighting each common attribute and also weighting the extent to which the user is (e.g., heavily) interested in the known products, the system can use the weighting to assess the likelihood of the user being interested in new articles and related offerings. As discussed above, this further access information can be tracked and used to evolve and augment the internal data for further iterative magazine product offerings, for successful/desirable branding and marketing efforts.

As may be implemented with one or both of FIGS. 10A and 10B, or with other embodiments, an analytics algorithm-based approach is carried out using a computer/CPU or other processing circuitry as follows. One or more analytics factors, such as those characterized above, are collected for articles. For instance, factors relating to one or more of dwell time of users upon images in an article, quality of each image, image size, position of each image in the article, and feature recognition that identifies types of features in the images, may be utilized. The factors are optionally weighted to provide emphasis upon certain factors relative to others. The factors (weighted or otherwise) are assessed and utilized to select an image. This may involve, for example, scoring images within an article by assessing points relative to each of the one or more factors, and selecting an image having a highest score for display. This automated approach facilitates generation of a feature image that is used to capture reader attention while also providing a tailored, or "smart" choice of imagery to use in characterizing an article. A similar approach can be utilized for selecting article-characterization text (e.g., with analytics factors including automated recognition of parts of speech for identifying interesting text, such as a subject or other key information).

Figure 11:
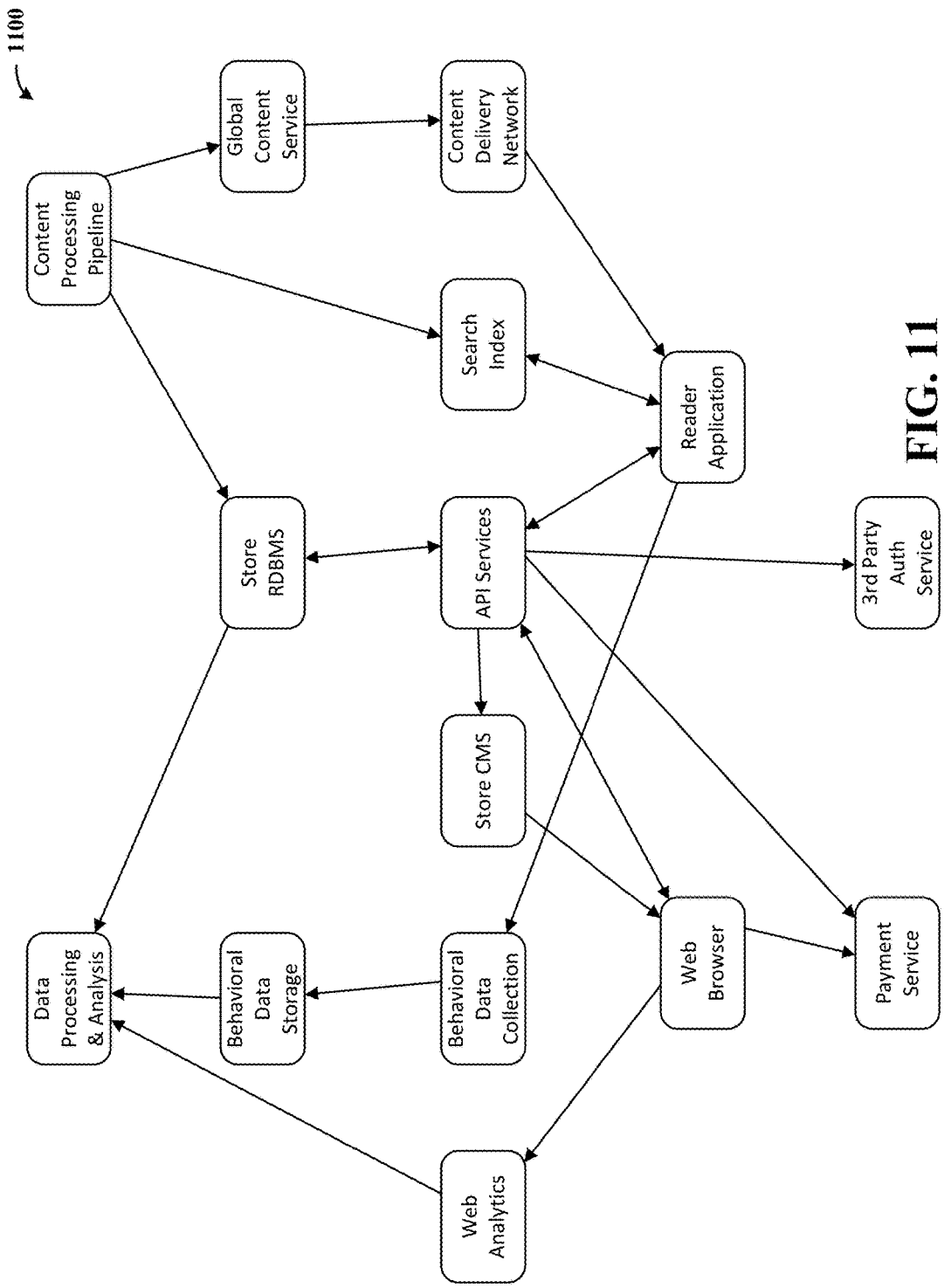
FIG. 11 shows a system as may be implemented for correlating prior and current record linkage results, in accordance with another example embodiment.
Figure 12:
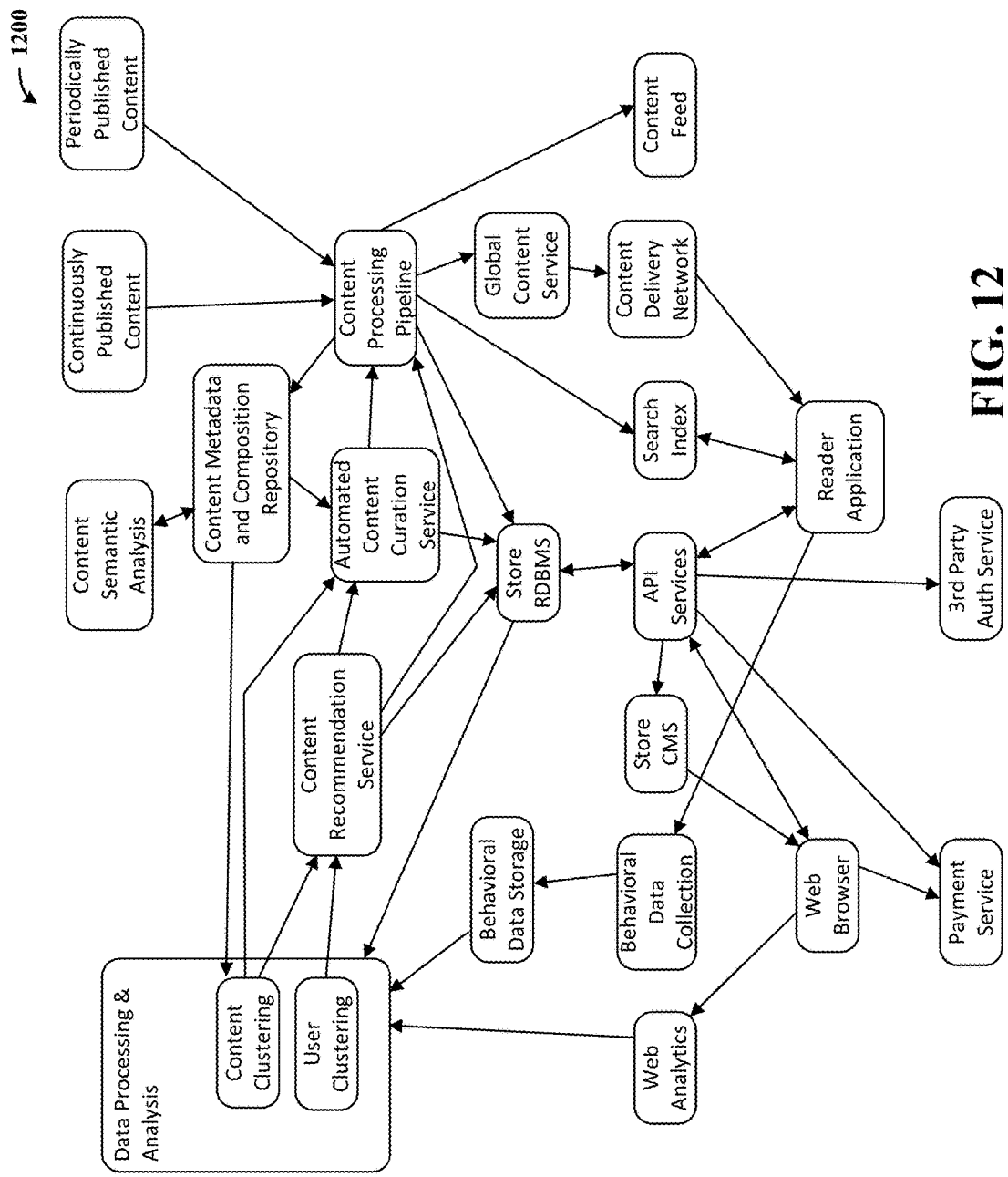
FIG. 12 shows another system as may be implemented for correlating prior and current record linkage results, in accordance with another example embodiment.

FIG. 11 shows a system 1100 as may be implemented for correlating prior and current record linkage results, in accordance with another example embodiment. FIG. 12 shows yet another system 1200 as may be implemented for correlating prior and current record linkage results, in accordance with another example embodiment. Each of the respective components is carried out in accordance with one or more embodiments per the indicated function, as may be consistent with the above.

Figure 13:
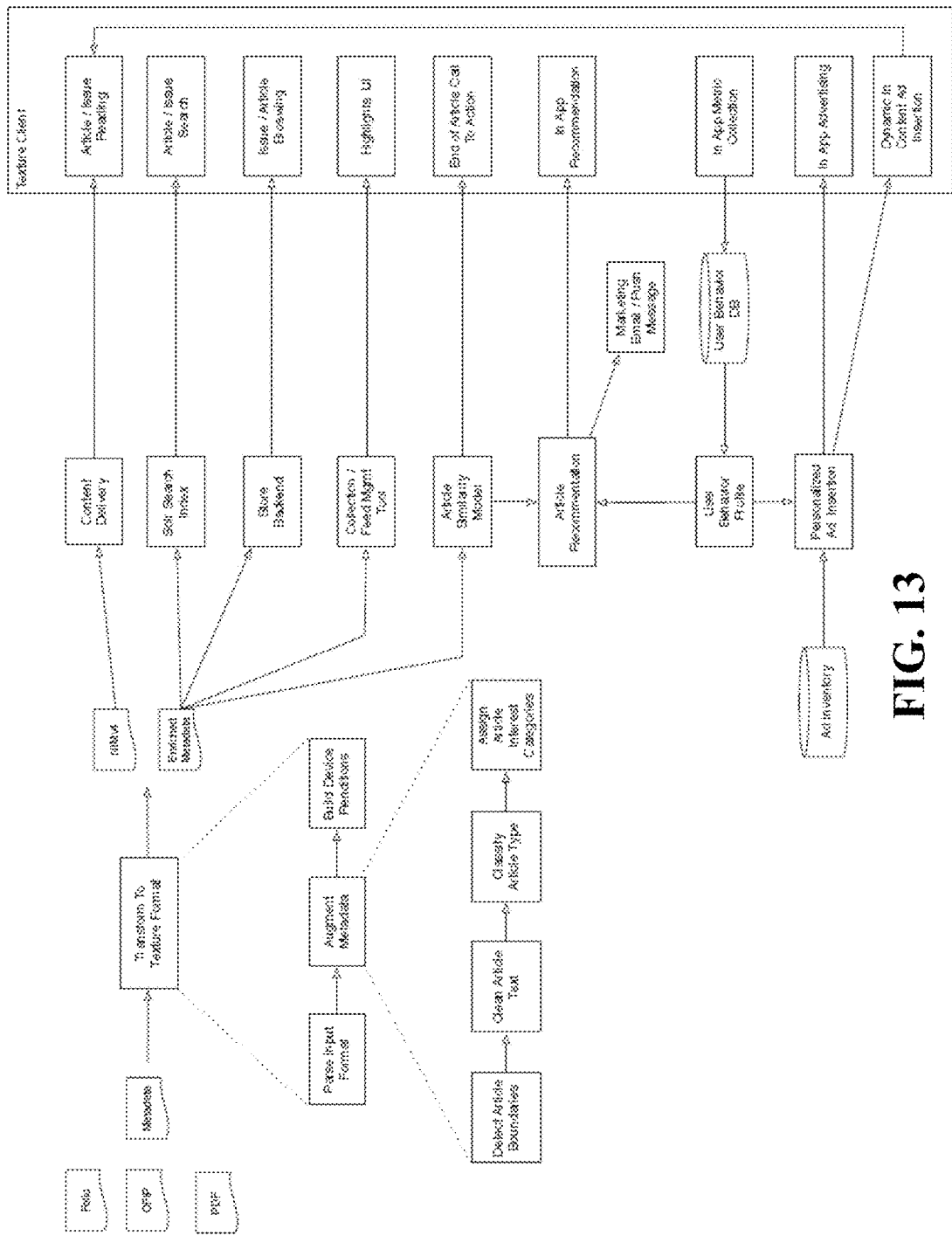
FIG. 13 shows an overview system diagram, as may be implemented in accordance with one or more embodiments.

FIG. 13 shows an overview system diagram, as may be implemented in accordance with one or more embodiments. A client (texture client) application is depicted for running on a magazine reader's device, such as on a computer or tablet device. A variety of article functions are carried out for facilitating user interaction, including article/issue reading, searching and browsing, as well as presenting highlights such as may involve utilizing a cover with successive screen pages using an article summary/overview approach as noted herein. Other functions, such an end-of article call to action for transitioning from an article-reading mode into another content presentation mode, or as providing recommended articles, can be carried out as well. For the latter article recommendation, a similar approach to that noted with highlight presentation can be utilized to provide recommended articles from an issue, or in the form of a virtual issue as characterized herein and utilizing articles from a variety of electronic magazine issues.

Advertising information is presented via the client application, in accordance with one or more embodiments/implementations. For instance, advertising can be inserted in a predefined manner within the client application, and/or with dynamic insertion as part of article reading. Such advertisement may, for example, be presented in a predefined location on one or more respective article pages.

In various implementations, the client application also collects metric information, which may pertain to a variety of user behaviors. The metrics can be stored in a remote database and used in a variety of manners, such as to facilitate article recommendation or to personalize advertising that is presented via the client. This metric data is specific to the magazine reader using the client application, and can be augmented with other metrics data for other users, to present articles, article recommendations, or advertising via the client application.

As also shown in FIG. 13, a variety of front-end functions are carried out for feeding media content to the client application. Such functions may include, for example, generating information for managing the presentation of highlights, recommended articles and/or advertising, which may utilize metric data as noted above. Various other aspects, such as transformation of incoming data into a common format, related mapping, as well as article parsing as may include identification of article boundaries, cleaning of article text, article classification and category assignment may also be carried out in this regard. For general information regarding article presentation, and for specific information regarding approaches to articles transformation, processing, characterization and presentation as may be implemented in accordance with embodiments herein, reference may be made to U.S. Pat. Nos. 8,977,964, 8,978,149 and 9,274,694, to U.S. patent application Ser. No. 14/681, 911, and to PCT Patent Application No. PCT/US2015/66849, all of which are fully incorporated herein by reference.

Figure 14:
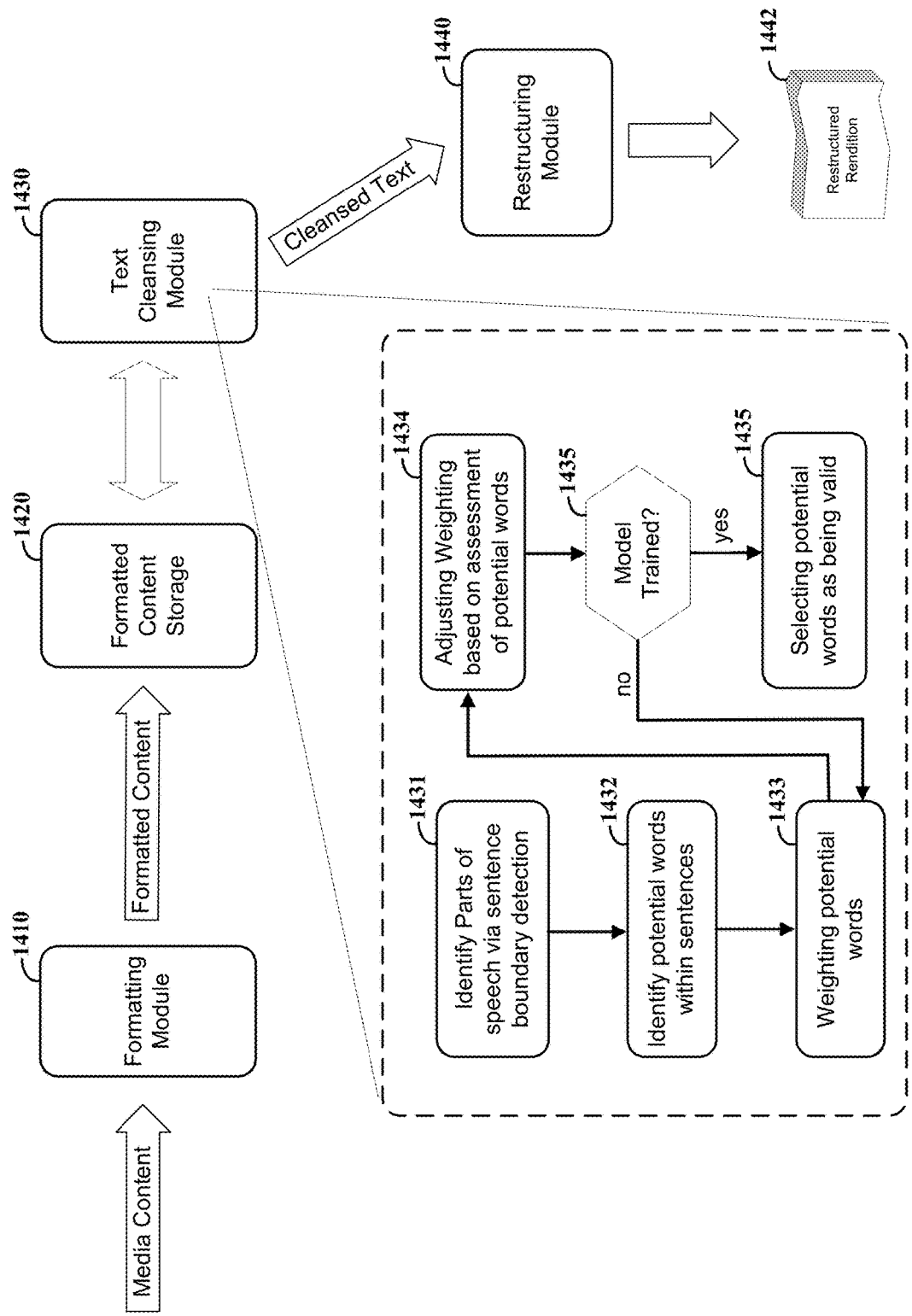
FIG. 14 shows a system and approach for generating renditions, which may be implemented for the display of articles in accordance with one or more embodiments herein.

FIG. 14 shows a system and approach for generating renditions, which may be implemented for the display of articles in accordance with one or more embodiments herein. A formatting module 1410 formats incoming media content, which is stored at 1420. A text cleansing module 1430 operates to cleanse the formatted content stored at 1420, and provides cleansed text to restructuring module 1440, which generates restructured renditions such as rendition 1442.

In some embodiments, the approach shown in FIG. 14 is implemented as follows for cleaning text data via text cleansing module 1430, for generating electronic magazine articles. Different types of media content data having disparate formats and corresponding to respective sets of media content received from disparate content providers, are formatted into media content data in a common format type. The different sets of media content data are stored with a common format type. For text content within each of the sets of the media content stored with the common format type, parts of speech within the sets of media content are identified at block 1431 by detecting boundaries of sentences within the text content, and potential words are identified within each of the sentences at block 1432. Each of the potential words is weighted at block 1433 based on the identified parts of speech, text within the potential words and a trained model for identifying words as being invalid. The weighting is adjusted (e.g., training a model) at block 1434, based on an assessment of the potential words, and the step of weighting can be repeated utilizing the adjusted weighting (e.g., if the model is not determined to be trained at 1435). For each of the sentences, ones of the potential words are selected as being valid at block 1435, based on the weighting and a text cleansing threshold. Portions of the media content data in the common format type are restructured into restructured renditions having an electronic article-oriented structure defined by the common format type by, for a plurality of articles within the media content data, generating sentences having cleaned text including the selected ones of the potential words.

In various embodiments, approaches as above are implemented in the context of providing media content access options to a user (e.g., articles in a magazine), with requested articles being reformatted on-the-fly for the user's device from commonly-formatted data as noted. Accordingly, such a magazine includes multiple files that may be presented separately to the user as access is requested, without providing the entire magazine (or, e.g., without providing an entire article).

Various blocks, modules or other circuits may be implemented to carry out one or more of the operations and activities described herein and/or shown in the figures. Also, the skilled artisan would also recognize that various terminology as used in the Specification (including claims) connote a plain meaning in the art unless otherwise indicated. As examples, the Specification describes and/or illustrates aspects useful for implementing the claimed disclosure by way of various blocks, modules and/or other circuits which exemplify how certain embodiments may be carried out in the form or structures, steps, functions, operations, activities, etc. In these contexts, a "block" (also sometimes "logic circuitry" or "module") is a circuit that carries out one or more of these or related operations/activities (e.g., the content builder and manager blocks of FIGS. 1-1H, or respective content builder, parsing, and other blocks as shown in FIGS. 4-7). For example, in certain of the above-discussed embodiments, one or more modules are discrete logic circuits or programmable logic circuits configured and arranged for implementing these operations/activities, as in the circuit modules shown in FIGS. 1-1H and/or in related aspects as combined with one or more of the recited patent documents herein.

In certain embodiments, such a programmable circuit is one or more computer circuits, including memory circuitry for storing and accessing a program to be executed as a set (or sets) of instructions (and/or to be used as configuration data to define how the programmable circuit is to perform). An algorithm or process as described in connection with one or more of FIGS. 1-1H is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as another circuit, server, module, or processor the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured and arranged to format . . . " is interpreted as "circuit configured and arranged to format . . . ").

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, various different types of magazine issues can be combined and implemented in the context of a single resulting issue, in accordance with one or more embodiments. In addition, the various embodiments described herein may be combined in certain embodiments, and various aspects of individual embodiments may be implemented as separate embodiments. Further, reference made to media content may generally involve digital media content as characterized elsewhere. Such modifications do not depart from the true spirit and scope of various aspects of the disclosure, including aspects set forth in the claims.

What is claimed is:

1. An apparatus comprising:
a first circuit configured and arranged to provide display imagery for articles in a plurality of electronic magazine issues by, for each article,
identifying a feature image and article-characterization text from imagery and text associated with the article, and
generating and outputting article summary imagery that includes the feature image and the article-characterization text; and
a second circuit configured and arranged to provide overviews of electronic magazine issues to be presented on a remote reader display by, for each electronic magazine issue to be presented on the remote reader display,
causing display of issue cover imagery for the electronic magazine issue on the remote reader display; and
causing moving display of the article summary imagery for the electronic magazine issue by autonomously causing the display of at least a portion of the issue cover imagery to be replaced by a set of successive screen pages, each successive screen page respectively including the article summary imagery for one of the articles in the electronic magazine issues.

2. The apparatus of claim 1, wherein the first circuit is configured and arranged to generate the article summary imagery for each article by selecting the feature image based on metadata or analytics characterizing one or more of image size, image quality, image dwell time of at least one magazine reader viewing the article with which the feature image is associated, and a combination thereof.

3. The apparatus of claim 1, wherein the second circuit is configured and arranged to cause the display of the at least a portion of the issue cover imagery to be replaced by the set of successive screen pages by maintaining display of a common aspect of the issue cover imagery in a first image layer while displaying each of the successive screen pages in one or more additional image layers, therein providing automated engagement with a magazine reader via moving display of the article summary imagery relative to the issue cover imagery.

4. The apparatus of claim 1, wherein the second circuit is configured and arranged to cause the moving display of the article summary imagery by displaying each screen page as one or more still images with movement depicted by at least one of the feature image and the article-characterization text moving across the remote reader display, and thereafter causing display of another of the successive screen pages to be displayed at the remote reader display.

5. The apparatus of claim 1, wherein the second circuit includes circuitry and an application running on the remote reader display, configured and arranged to cause the display of the issue cover imagery, and to cause the display of the at least a portion of the issue cover imagery to be replaced by the set of successive screen pages on the remote reader display.

6. An apparatus comprising:
a first circuit configured and arranged to provide issue cover imagery and article summary imagery for content from each of a plurality of electronic magazine issues, by
for each electronic magazine issue, obtaining issue cover imagery for representation of the electronic magazine issue, having a cover image and title, and
for articles in the electronic magazine issue, identifying a feature image and article-characterization text from imagery and text associated with the article, and generating and outputting article summary imagery that includes the feature image and the article-characterization text;
a second circuit configured and arranged to provide moving display information for each of the electronic magazine issues, by configuring the issue cover imagery and article summary imagery for moving display of a still image on a remote reader display utilized by a magazine reader; and
a third circuit including a server, configured and arranged to, for each electronic magazine issue to be presented on the remote reader display, cause moving presentation of the issue cover imagery and article summary imagery at the remote reader display by, via a user-communication interface medium,
causing display of the issue cover imagery on the remote reader display; and
causing moving display of the article summary imagery by autonomously causing the display of at least a portion of the issue cover imagery to be replaced by a set of successive screen pages, each successive screen page respectively including the article summary imagery for one of the articles.

7. The apparatus of claim 6, wherein the first circuit is configured and arranged to generate the article summary imagery for each article by selecting the feature image based on analytics characterizing one or more of image size, image quality, image dwell time of at least one magazine reader viewing the article with which the feature image is associated, and a combination thereof.

8. The apparatus of claim 6, wherein the first circuit is configured and arranged to generate the article summary imagery for each article by selecting the feature image and the article-characterization text from imagery and text associated with the article, based on metadata for the article.

9. The apparatus of claim 6, wherein the third circuit is configured and arranged to cause the display of the issue cover imagery to be replaced by the set of successive screen pages by maintaining display of a common aspect of the issue cover imagery in a first image layer while displaying each of the successive screen pages in a second image layer, therein providing automated engagement with the magazine reader via moving display of the article summary imagery relative to the issue cover imagery.

10. The apparatus of claim 6, wherein the third circuit is configured and arranged to cause the moving display of the article summary imagery by causing the display of each of the successive screen pages as one or more still image layers, with movement depicted by at least one of the feature image and the article-characterization text moving across the remote reader display.

11. The apparatus of claim 6, wherein the third circuit is configured and arranged to cause the moving display of the article summary imagery by displaying each screen page as a still image with movement depicted by at least one of the feature image and the article-characterization text moving across the remote reader display, and thereafter causing display of another of the successive screen pages to be displayed at the remote reader display.

12. The apparatus of claim 6, wherein
the first circuit is configured and arranged to generate the article summary imagery by embedding a hyperlink within at least one of the feature image and the article-characterization text, and
the third circuit is configured and arranged to, in response to the magazine reader selecting the embedded hyperlink via the remote reader display, cause display of a portion of the article corresponding to the article summary imagery at the remote reader display.

13. The apparatus of claim 6, wherein the second circuit is configured and arranged to configure the issue cover imagery and article summary imagery for moving display of the still image by generating a video including moving still image layers for each of the successive screen pages.

14. The apparatus of claim 6, wherein the second circuit is configured and arranged to configure the issue cover imagery and article summary imagery for moving display of the still image by providing a background for each screen page, the background including a title of the electronic magazine issue.

15. The apparatus of claim 6, wherein the third circuit is configured and arranged to cause, at the remote reader display, playback of audio while each of the successive screen pages is presented, the audio being different for each one of the screen pages and characterizing the content of the article to which the respective screen pages apply.

16. The apparatus of claim 6, wherein autonomously causing the display of the issue cover imagery to be replaced by a set of successive screen pages includes causing the display of multiple image planes on the remote reader display, each plane including images, including text, or including a combination of images and text.

17. The apparatus of claim 6, wherein
the second circuit is configured and arranged to store the configured issue cover imagery and article summary imagery at the server; and
the third circuit is configured and arranged to cause the display of the issue cover imagery, and to cause the moving display of the article summary imagery, by transmitting the issue cover imagery and the article summary imagery from the server to the remote reader display via the user-communication interface medium, and controlling an application running on the remote reader display to manipulate imagery displayed at the remote reader display.

18. The apparatus of claim 6, wherein the third circuit is configured and arranged to cause the moving display of the article summary imagery based on user-specified article presentation preferences provided by the magazine reader.

19. The apparatus of claim 18, wherein the user-specified article presentation preferences specify at least one of the following characteristics: a rate of speed of display of the articles, sequencing of the articles, and a combination thereof.

20. The apparatus of claim 6, wherein
the first circuit is configured and arranged to obtain the issue cover imagery for a virtual magazine issue having articles drawn from disparate electronic magazine issues, the third circuit is configured and arranged to
cause the display of the issue cover imagery by causing display of cover imagery representative of the virtual magazine issue and characterizing two or more of the disparate electronic magazine issues, and cause the moving display of the article summary imagery by causing the display of respective screen pages for articles from different ones of the disparate magazine issues from which the feature image and article-characterization text are drawn for the articles.

21. The apparatus of claim 20, wherein the first circuit is configured and arranged to populate the virtual magazine issue with articles by selecting the articles form the disparate electronic magazine issues based on one or more of: subscriptions of the magazine reader, user analytics associated with the magazine reader, and user analytics associated with other magazine readers having characteristics that are common to those of the magazine reader.

* * * * *